US012711671B2

(12) United States Patent
Helbling et al.

(10) Patent No.: US 12,711,671 B2
(45) Date of Patent: Aug. 18, 2026

(54) USER PREFERENCE GUIDED CONTENT GENERATION FROM PAIRED COMPARISONS

(71) Applicant: Georgia Tech Research Corporation, Atlanta, GA (US)

(72) Inventors: Alec Fisher Helbling, Atlanta, GA (US); Kion Fallah, Atlanta, GA (US); Matthew O'Shaughnessy, Atlanta, GA (US); Christopher John Rozell, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 123 days.

(21) Appl. No.: 18/623,675

(22) Filed: Apr. 1, 2024

(65) Prior Publication Data

US 2024/0412420 A1 Dec. 12, 2024

Related U.S. Application Data

(60) Provisional application No. 63/493,642, filed on Mar. 31, 2023.

(51) Int. Cl.
*G06T 11/00* (2026.01)

(52) U.S. Cl.
CPC ......... *G06T 11/00* (2013.01); *G06T 2211/441* (2023.08)

(58) Field of Classification Search
None
See application file for complete search history.

(56) References Cited

U.S. PATENT DOCUMENTS 12,211,598 B1 * 1/2025 Aravamudan ......... G16H 10/20
2017/0004383 A1 * 1/2017 Lin ......................... G06F 16/53
2019/0251612 A1 * 8/2019 Fang .................... G06N 3/0475
2019/0287283 A1 * 9/2019 Lin .......................... G06T 5/77
2019/0294631 A1 * 9/2019 Alcantara ............. G06F 16/743
2020/0327733 A1 * 10/2020 Mueller .............. G06F 3/04845
2021/0286921 A1 * 9/2021 Kuniavsky .............. G06F 30/15
2023/0022550 A1 * 1/2023 Guo ........................ G06T 11/60
2023/0131321 A1 * 4/2023 Fisher ................... G06T 11/001 345/629
2023/0230198 A1 * 7/2023 Zhang ...................... G06N 3/08 382/276
2023/0252906 A1 * 8/2023 Fee ........................ G09B 19/00
2024/0127492 A1 * 4/2024 Jayaraman ............. G06Q 50/04
2024/0169621 A1 * 5/2024 Nitzan ................. G06V 10/774

(Continued)

*Primary Examiner* — David H Chu

(74) *Attorney, Agent, or Firm* — TROUTMAN PEPPER LOCKE LLP; Ryan A. Schneider; Nicholas H. Doss

(57) ABSTRACT

Systems and methods for guiding the generation of items based on a user preference. The system comprises a computing device comprising one or more processors, a neural network a transceiver, and at least one memory in communication with the computing device, the neural network, and the transceiver and storing computer program code. The system is configured to output a first set of items having a first attribute. The system may receive a first user input to generate, using the neural network, to generate one or more additional set of items (e.g., images) based on user preference. The system is configured to adjust and generate one or more new items until the at least one modified first attribute meets a desired preference.

22 Claims, 17 Drawing Sheets

(56) References Cited

U.S. PATENT DOCUMENTS

| | | | | |
|---|---|---|---|---|
| 2024/0264723 | A1* | 8/2024 | Davidson | G06N 3/045 |
| 2024/0296535 | A1* | 9/2024 | Bakunov | G06T 7/0002 |
| 2024/0296606 | A1* | 9/2024 | Smetanin | G06N 3/045 |
| 2024/0320867 | A1* | 9/2024 | Bean | G06T 11/00 |
| 2024/0331210 | A1* | 10/2024 | Saad | G06N 3/088 |
| 2024/0331237 | A1* | 10/2024 | Ramesh | G06N 3/044 |

* cited by examiner

USER PREFERENCE GUIDED CONTENT GENERATION FROM PAIRED COMPARISONS

CROSS-REFERENCE TO RELATED APPLICATIONS

This Application claims the benefit of, and priority under 35 U.S.C. § 119(e) to, U.S. Provisional Patent Application No. 63/493,642, entitled "User Preference Guided Content Generation from Paired Comparisons," filed Mar. 31, 2023, the contents of which are hereby incorporated by reference herein in their entirety as if fully set forth below.

GOVERNMENT LICENSE RIGHTS

This invention was made with government support under Agreement No. AWD-100408, awarded by National Science Foundation. The government has certain rights in the invention.

BACKGROUND OF THE DISCLOSURE

1. Field of the Invention

The present invention relates generally to systems and methods, and more particularly to deep generative model and methods for improving the controllability of generated items (e.g., images) based on a user's preference.

2. Description of Related Art

Deep generative models have demonstrated the ability to generate high-quality images of content, for example human faces. To expand their capabilities, there is substantial interest in improving the controllability of the models based on input received from a user. By improving the controllability of the models, it provides the end user to modify the continuous attributes of images outputted by the generative model. Some models allow a user to edit a set of visual attributes found through unsupervised learning. Other models leverage supervised learning or pre-trained classifiers to form mappings from attributes to the generative model latent space. However, with the current models, if a user wants to precisely modify the intensity of at least one attribute, the user must explicitly tune one or more set of quantitative attributes. In current models, the user interface is ill-suited for modifying the relative attributes of an image, for example how "sad" or "tired" a person looks. Unlike properties such as "temperature," people do not share a common notion of scale for one or more attribute. Thus, making it difficult for the user to quantify at least one attribute. This limits the utility of attribute-conditioned generative models to the class of attributes that can be easily quantified.

Thus, technological innovation is needed to provide systems and method of deep generative models that overcome the limitation of the conventional systems and methods. Thus, one fucus of the present invention is to provide a deep generative model system and methods related thereof that can more accurately adjusts at least one relative attribute of a generated image.

BRIEF SUMMARY

Briefly described, according to exemplary embodiments of the present invention, systems and methods of an innovative system for predicting a user preference for at least one generated item. In some embodiments, the present invention outputs a first set of items to receive feedback data to predict a preference to at least one attribute and/or one or more additional items to receive additional data to predict one or more updated at least one attribute.

In an exemplary embodiment of the present invention, a system comprising a computing device that comprises one or more processors, a neural network a transceiver, and/or at least one memory. In various embodiments, the at least one memory may be in communication with the computing device, the neural network, and the transceiver. The at least one memory may store computer program code, that when executed by the computing device, to cause the system to output a first set of items having a first attribute. The program code is further configured to cause the system to receive a first user input, such that, the first user input comprises an indication of a selection of a first item in the first set of items. The program code is further configured to cause the system to store the first user input to the neural network. The program code is further configured to cause the system to generate, using the neural network, a second set of items comprising a first modified first attribute. The first modified first attribute may be based, at least in part, on the user preference for the first attribute. The program code is further configured to cause the system to output the second set of items. The program code is further configured to cause the system to receive second user input comprising an indication of a selection of a first item in the second set of items. The program code is further configured to cause the system to determined based on the first and second user inputs, an updated user preference for the first attribute. The program code is further configured to cause the system to generate, using the neural network, a third set of items comprising a second modified first attribute, such that, the second modified first attribute is based, at least in part, on the updated user preference for the first attribute. In various embodiments, the feedback data may be stored to the neural network.

In various embodiments, the neural network may be further configured to map similar user preferences related to a first modified first attribute and a second modified second attribute closely together within a latent space to improve the system prediction and generation of at least one item. In various embodiments, the system may be further configured to output a second set of items with a second feedback prompt to a user device. The second set of items may comprise a first item and one or more additional item. In an example embodiment, the first item comprises a first configuration of the first modified first attribute and the one or more additional item comprises one or more additional configurations of the first modified first attribute. The first configuration and the one or more additional configurations are configured to be different.

In various embodiments, the system may receive the second user input from the user device, such that, the second user input comprises information related to a selection of the first item or the one or more additional item, such that, the selection is based on a user preference related to a modified first attribute of the first item or the one or more additional items.

In various embodiments, the system may be further configured to output the third set of items with a third feedback prompt to a user device. The third set of items may comprise a first item and one or more additional item. In various embodiments, the first item may comprise a first configuration of the second modified first attribute and the one or more additional item comprises one or more additional configuration of second modified first attribute. In various embodiments, the first configuration and the one or more additional configuration of the second modified first attribute are configured to be different.

In an example embodiment, the at least one memory may further cause the system to cause the system to store feedback data to the neural network. The at least one memory may further cause the system to predict a user preference to an adjustment of at least one modified first attribute or one or more additional item of a set of items. The at least one memory may be additionally configured to generate one or more new items based, at least in part, on the prediction of the user preference related to at least one modified first attribute. In various embodiments, they system may be configured to adjust and generate one or more new items until the at least one modified first attribute meets a desired preference.

In an exemplary embodiment of the present a method is provided for guiding generation of items. The method may comprise outputting a first set of items having a first attribute. The method is further comprising receiving a first user input, such that, the first user input comprises an indication of a selection of a first item in the first set of items. The method is further configured for storing the first user input to the neural network. The method is further comprising generating, using the neural network, a second set of items comprising a first modified first attribute. The first modified first attribute may be based, at least in part, on the user preference for the first attribute. The method may further comprise outputting the second set of items. The method may further comprise receiving second user input comprising an indication of a selection of a first item in the second set of items. The method may further comprise determining based on the first and second user inputs, an updated user preference for the first attribute. The method may further comprise generating, using the neural network, a third set of items comprising a second modified first attribute, such that, the second modified first attribute is based, at least in part, on the updated user preference for the first attribute. In various embodiments, the feedback data may be stored to the neural network.

In various embodiments, the neural network may be further configured to map similar user preferences related to a first modified first attribute and a second modified second attribute closely together within a latent space to improve the system prediction and generation of at least one item. In various embodiments, the method may further comprise outputting a second set of items with a second feedback prompt to a user device. The second set of items may comprise a first item and one or more additional item. In an example embodiment, the first item comprises a first configuration of the first modified first attribute and the one or more additional item comprises one or more additional configurations of the first modified first attribute. The first configuration and the one or more additional configurations are configured to be different.

In various embodiments, the method may receive the second user input from the user device, such that, the second user input comprises information related to a selection of the first item or the one or more additional item, such that, the selection is based on a user preference related to a modified first attribute of the first item or the one or more additional items.

In various embodiments, the method may further comprise outputting the third set of items with a third feedback prompt to a user device. The third set of items may comprise a first item and one or more additional item. In various embodiments, the first item may comprise a first configuration of the second modified first attribute and the one or more additional item comprises one or more additional configuration of second modified first attribute. In various embodiments, the first configuration and the one or more additional configuration of the second modified first attribute are configured to be different.

In an example embodiment, the method may further comprise causing the system to store feedback data to the neural network. The method may further comprise predicting a user preference to an adjustment of at least one modified first attribute or one or more additional item of a set of items. The method may additionally comprise generating one or more new items based, at least in part, on the prediction of the user preference related to at least one modified first attribute. In various embodiments, they system may be configured to adjust and generate one or more new items until the at least one modified first attribute meets a desired preference.

In an exemplary embodiment of the present invention a non-transitory computer readable medium having stored thereon instructions comprising executable code for guiding generation of items, when executed by one or more processors, causes the processor to output a first set of items having a first attribute. The instructions are further configured to cause the processor to receive a first user input, such that, the first user input comprises an indication of a selection of a first item in the first set of items. The instructions are further configured to cause the processor to store the first user input to the neural network. The instructions are further configured to cause the processor to generate, using the neural network, a second set of items comprising a first modified first attribute. The first modified first attribute may be based, at least in part, on the user preference for the first attribute. The instructions are further configured to cause the processor to output the second set of items. The instructions are further configured to cause the processor to receive second user input comprising an indication of a selection of a first item in the second set of items. The instructions are further configured to cause the processor to determined based on the first and second user inputs, an updated user preference for the first attribute. The instructions are further configured to cause the processor to generate, using the neural network, a third set of items comprising a second modified first attribute, such that, the second modified first attribute is based, at least in part, on the updated user preference for the first attribute. In various embodiments, the feedback data may be stored to the neural network.

In various embodiments, the neural network may be further configured to map similar user preferences related to a first modified first attribute and a second modified second attribute closely together within a latent space to improve a system prediction and generation of at least one item. In various embodiments, the system may be further configured to output a second set of items with a second feedback prompt to a user device. The second set of items may comprise a first item and one or more additional item. In an example embodiment, the first item comprises a first configuration of the first modified first attribute and the one or more additional item comprises one or more additional configurations of the first modified first attribute. The first configuration and the one or more additional configurations are configured to be different.

In various embodiments, the processor may receive the second user input from the user device, such that, the second user input comprises information related to a selection of the first item or the one or more additional item, such that, the selection is based on a user preference related to a modified first attribute of the first item or the one or more additional items.

In various embodiments, the non-transitory computer readable medium further comprises instructions for output the third set of items with a third feedback prompt to a user device. The third set of items may comprise a first item and one or more additional item. In various embodiments, the first item may comprise a first configuration of the second modified first attribute and the one or more additional item comprises one or more additional configuration of second modified first attribute. In various embodiments, the first configuration and the one or more additional configuration of the second modified first attribute are configured to be different.

In an example embodiment, the non-transitory computer readable medium further comprises instructions to store feedback data to the neural network. The non-transitory computer readable medium further comprises instructions to predict a user preference to an adjustment of at least one modified first attribute or one or more additional item of a set of items. the non-transitory computer readable medium further comprises instructions to generate one or more new items based, at least in part, on the prediction of the user preference related to at least one modified first attribute. In various embodiments, they system may be configured to adjust and generate one or more new items until the at least one modified first attribute meets a desired preference.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Implementations, features, and aspects of the disclosed technology are described in detail herein and are considered a part of the claimed disclosed technology. Other implementations, features, and aspects can be understood with reference to the following detailed description, accompanying drawings, and claims. Wherever possible, the same reference numbers are used throughout the drawings to refer to the same or like members of an embodiment. Reference will now be made to the accompanying figures and flow diagrams, which are not necessarily drawn to scale.

DETAILED DESCRIPTION

Figure 1:
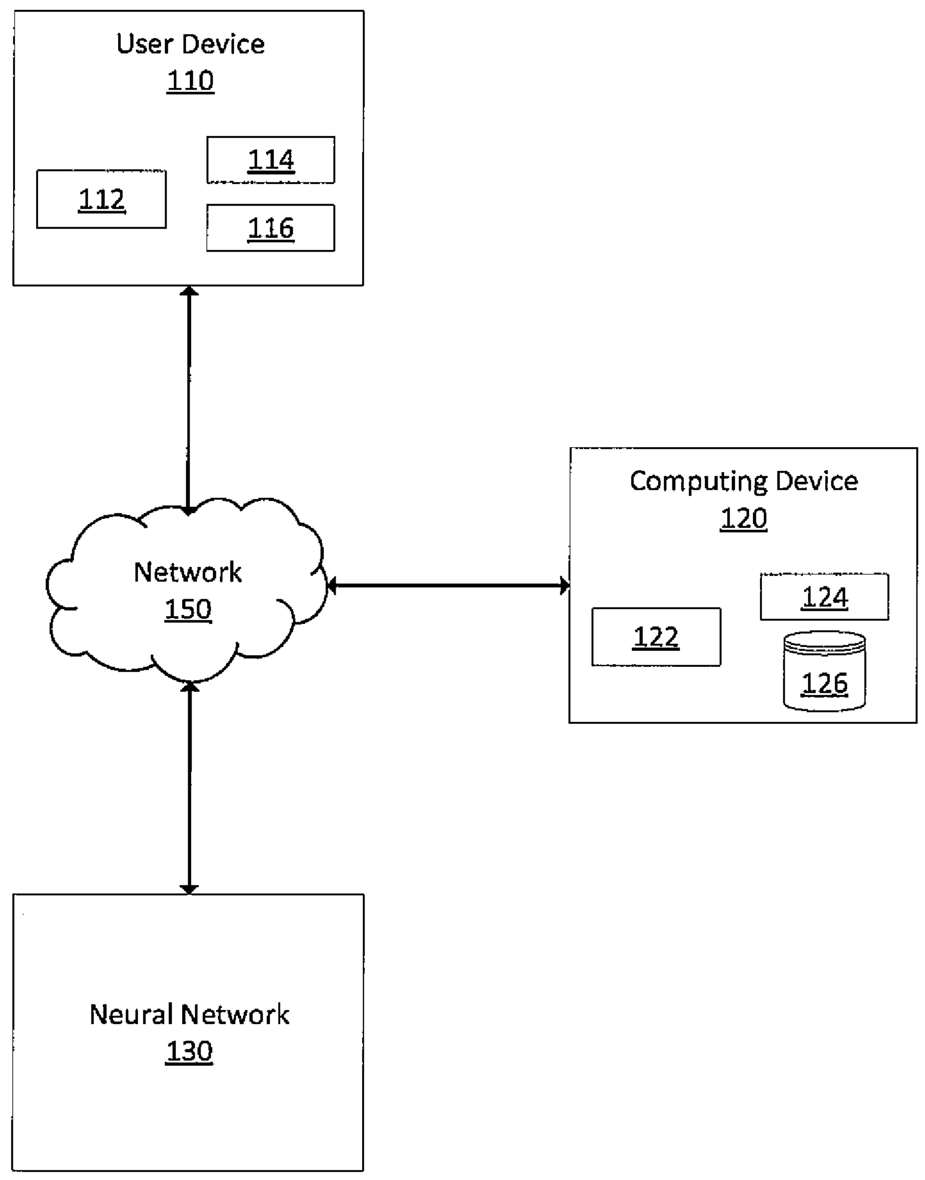
FIG. 1 illustrates a block diagram of an example system for generating at least one item, in accordance with some embodiments of the present disclosure.

Some implementations of the disclosed technology will be described more fully with reference to the accompanying drawings. This disclosed technology can be embodied in many different forms, however, and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

It is also to be understood that the mention of one or more method steps does not imply that the methods steps must be performed in a particular order or preclude the presence of additional method steps or intervening method steps between the steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

In various embodiments, the generative model as described herein may be configured to adjust at least one component of a generated item. The generative model may adjust at least one attribute and/or component based on a user preference, such that, the user may provide a preference via a first input and/or at least one response to a feedback prompt. In various embodiments, the first user input may be in the form of a selection from at least a pair of starting items (e.g., starting images), such that, each item comprises a different configuration of at least one attribute. In one or more embodiments, the item may be an image, a product (e.g., coffee, toy, food, drinks, etc.), an audio file, a piece of data, a data set, at least a portion of code, etc. In various embodiments, the at least one attribute may be an attribute of a photo, a sound level, a portion of data, a flavoring, a topping, a color of a toy, a function of a toy, etc. In various embodiments, the generative model as described herein may be applied to any product that comprises at least one attribute, such that, the generative model is able to change at least one attribute for a user's preference.

As described herein, the generative model may be applied to adjust at least one attribute of at least one item (e.g., at least one image) based on at least one user preference. In various embodiments, the user may provide a first preference by providing a response to a first set of items having a first attribute (e.g., first component) indicating an item with a preferred first attribute. The first set of items may comprise a pair of items (e.g., a pair of images) with at least one attribute such as hair color, eye color, facial expression, etc. The user may select an item that it prefers, thus, providing preference data to the generative model. The generative model is configured to utilize the preference data to predict a user preference as it relates to the at least one attribute. In various embodiments, the generative model may generate a second set of items (e.g., set of images) that comprises a first item (e.g., a first image) and one or more additional item (e.g., one or more additional image). The first item is configured to have a first configuration of the at least modified first attribute and the one or more additional item is configured to have one or more additional configuration of the at least modified first attribute. In various embodiments, the first modified first attribute configuration and the one or more additional modified first attribute configuration of the at least one attribute are configured to be at least partially different. In various embodiments, the first modified first attribute configuration and the one or more additional first modified first attribute configuration is configured to be predicted by the generative model based on the user feedback and/or user preference.

In various embodiments, the generative model may output the set of items to a user device with a feedback prompt. The feedback prompt (e.g., first feedback prompt, second feedback prompt, third feedback prompt, and/or one or more additional feedback prompt) is configured to gather additional preference data related to the user preference based, at least in part, on one or more of the generated items comprising at least a modified first attribute. In various embodiments, the user may interact with the feedback prompt to provide feedback data (e.g., preference data) related to at least one item (e.g., image) that the user preference. In various embodiments, the generative model is configured to store the feedback data and map at least one attribute within a latent space in order to improve the predictability function of the generative model based on the user preference. One or more like attributes may be mapped closely together within the latent space in order to improve the efficiency of the prediction of the generative model in order to reduce the number of feedback prompts to achieve a desired item. In various embodiments, the generative model may generate one or more additional set of items and/or one or more additional feedback prompt until at least one item generated meets a predefined satisfaction. The predefined satisfaction may be based at least in part on a user target item.

FIG. 1 shows an example system 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the system 100 includes a user device 110, a computing device 120, a neural network 130, and a network 150. The user device 110 may include one or more processors 112, one or more transceivers 114, and a user portal 116. Additionally, computing device 120 may include one or more processors 122, one or more transceivers 124, and one or more databases 126.

Figure 2:
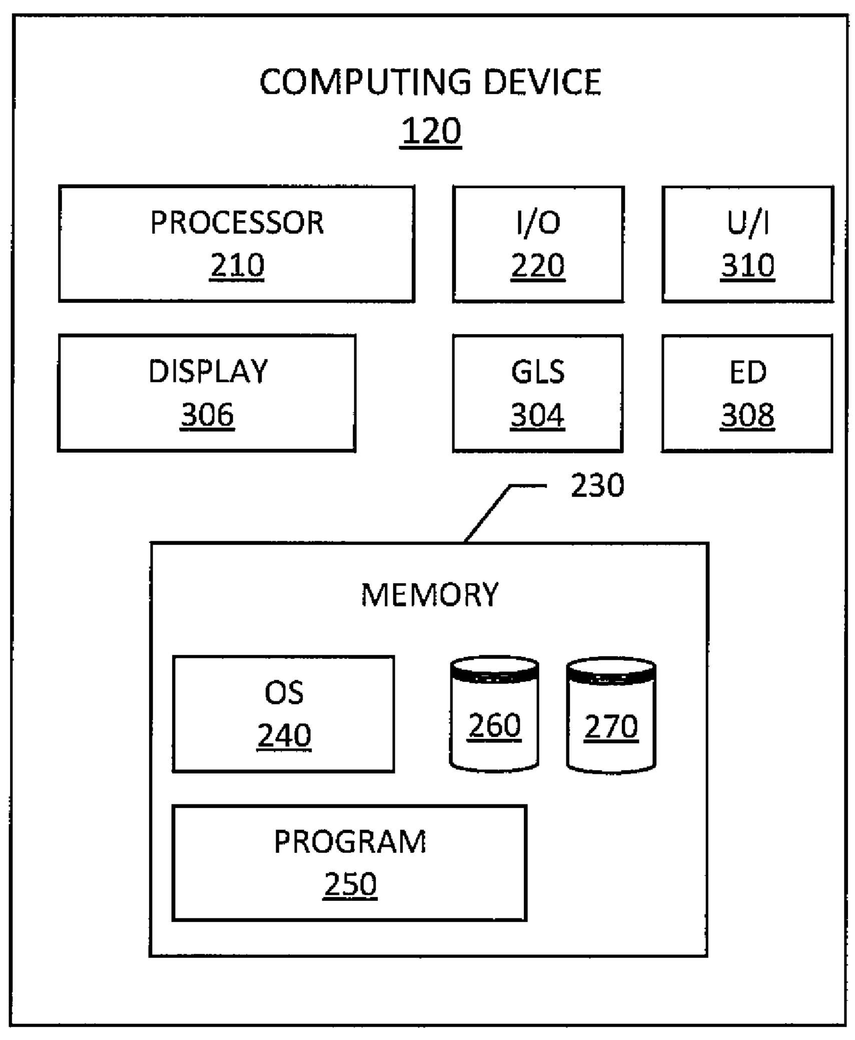
FIG. 2 illustrates a block diagram of an example computing device, in accordance with some embodiments of the present disclosure.

As non-limiting examples, the user device 110 may be a personal computer, a smartphone, a laptop computer, a tablet, or other personal computing device. Neural network 130 may include instructions and/or memory used to perform certain features disclosed herein. Network 150 may include a network of interconnected computing devices such as a local area network (LAN), Wi-Fi, Bluetooth, or other type of network and may be connected to an intranet or the Internet, among other things. Computing device 120 may include one or more physical or logical devices (e.g., servers) or drives and may be implemented as a single server or a bank of servers (e.g., in a "cloud"). An example computer architecture with reference to FIG. 2 is described below. The example computer architecture may be used to implement computing device 120. An example computer architecture that may be used to implement user device 110 is described below with reference to FIG. 3.

In certain implementations according to the present disclosure, the computing device 120 may transmit one or more sets of generated items (e.g., images) and/or a feedback prompt to a user device 110. In some examples, a user device 110 may transmit a first user input and/or at least one feedback data via a user portal 116 to the computing device 120.

The user device 110 may transmit a first user input to the computing device, wherein the first user input may comprise a preferent to an item (e.g., first set of images with at least one image) with at least one attribute. The user input may further comprise instructions for the computing device 120 to generatively adjust at least one attribute of at least one item. The neural network 130 may store data related to the first user input. The computing device may extract data from the user input using the processor 122. Further, processor 122 may assign a latent space identifier/vector to the at least one attribute. Processor 122 may generate a first item (e.g., first image) with at least one modified attribute and one or more additional item (e.g., one or more additional image) with at least one modified attribute. The at least one modified attribute of the first item is configured to be different than the at least one modified attribute of the one or more additional item. Transceiver 124 may send the set of items to the user device 110, wherein the set of items comprises the first item and the one or more additional item. In various embodiment, the processor 122 may be configured to predict at least one modification to the at least one attribute based at least in part on a user's preference and/or feedback data provided by the user.

Transceiver 124 may further transmit a feedback prompt to the user device 110. A user may interact with the feedback prompt to provide first feedback data to the computing device 120. The first feedback data may comprise information related to the user preference related to the at least one modified attribute of the first item or the one or more additional item of the first set of items. The neural network 130 may store the data related to the first feedback data. The processor 122 of the computing device may generate a first set of items. The first set of items may comprise either the first item or the one or more additional item of the first set of items and one or more second additional item. Transceiver 124 may send the first set of items to the user device 110, wherein the first set of items comprises the first item and the one or more additional item. Transceiver 124 may further transmit a feedback prompt to the user device 110. A user may interact with the feedback prompt to provide a second feedback data to the computing device 120. The neural network 130 may store the data related to the second feedback data. The processor 124 of the computing device may generate a second set of items and/or one or more additional set of items.

In some examples, the computing device 120 may comprise, for example, a cell phone, a smart phone, a tablet computer, a laptop computer, a desktop computer, a sever, or other electronic device. The computing device 120 may be a single server, for example, or may be configured as a distributed, or "cloud," computer system including multiple servers or computers that interoperate to perform one or more of the processes and functionalities associated with the disclosed embodiments. In some embodiments, the computing device 120 may further include a peripheral interface, a transceiver, a mobile network interface in communication with processor 210, a bus configured to facilitate communication between the various components of the computing device 120, and a power source configured to power one or more components of the computing device 120.

An example embodiment of a computing device 120 is shown in more detail in FIG. 2. As shown, computing device 120 may include processor 210, input/output ("I/O") device 220, memory 230 containing an operating system ("OS") 240, program 250. Computing device 120 may also have one or more processors 210, geographic location sensor ("GLS") 304 for determining the geographic location of computing device 120, display 306 for displaying content such as text messages, items, and selectable buttons/icons/links, environmental data ("ED") sensor 308 for obtaining environmental data including audio and/or visual information, and user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to I/O device 220 above. In some embodiments, environmental data sensor 308 may include a microphone and/or an image capture device, such as a digital camera.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include image processing database 260 and neural-network pipeline database 270 for storing related data to enable the computing device 120 to perform one or more of the processes and functionalities associated with the disclosed embodiments.

A peripheral interface may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. The transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, the computing device 120 may be configured to remotely communicate with one or more other devices, such as user device 110, neural network 130, and/or other external devices. According to some embodiments, the computing device 120 may utilize neural network 130 (or other suitable logic) to generate one or more sets of items comprising at least one attribute.

Processor 210 may include one or more of a microprocessor, a microcontroller, a digital signal processor, a co-processor or the like or combinations thereof capable of executing stored instructions and operating upon stored data. Memory 230 may include, in some implementations, one or more suitable types of memory (e.g. such as volatile or non-volatile memory, a random access memory (RAM), a read only memory (ROM), a programmable read-only memory (PROM), an erasable programmable read-only memory (EPROM), an electrically erasable programmable read-only memory (EEPROM), one or more magnetic disks, one or more optical disks, one or more floppy disks, one or more hard disks, one or more removable cartridges, a flash memory, a redundant array of independent disks (RAID), and the like), for storing files including an operating system, one or more application programs (including, for example, a web browser application, a widget or gadget engine, and or other applications, as necessary), executable instructions and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. Processor 210 may be a single core processor, for example, that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The computing device 120 may include one or more storage devices configured to store information used by processor 210 (or other components) to perform certain functions related to the disclosed embodiments. In one example, the computing device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the computing device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. The computing device 120 may include memory 230 including one or more programs 250, for example, to perform one or more functions of the disclosed embodiments. Moreover, processor 210 may execute one or more programs 250 located remotely from the computing device 120. For example, the computing device 120 may access one or more remote programs 250, that, when executed, perform functions related to disclosed embodiments.

The computing device 120 may also be communicatively connected to one or more memory devices (e.g., databases (not shown)) locally or through a network. The remote memory devices may be configured to store information and may be accessed and/or managed by the computing device 120. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

The computing device 120 may also include one or more I/O devices 220 that may include one or more interfaces (e.g., transceivers) for receiving signals or input from devices and providing signals or output to one or more devices that allow data to be received and/or transmitted by the computing device 120. The computing device 120 may include interface components, for example, which may provide interfaces to one or more input devices, such as one or more keyboards, mouse devices, touch screens, track pads, trackballs, scroll wheels, digital cameras, microphones, sensors, and the like, that enable the computing device 120 to receive data from one or more users.

In example embodiments of the disclosed technology, the computing device may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the computing device 120 has been described as one form for implementing the techniques described herein, those having ordinary skill in the art will appreciate that other, functionally equivalent techniques may be employed. As is known in the art, some or all of the functionality implemented via executable instructions may also be implemented using firmware and/or hardware devices such as, for example, application specific integrated circuits (ASICs), programmable logic arrays, state machines, etc. Furthermore, other implementations of the computing device may include a greater or lesser number of components than those illustrated.

Figure 3:
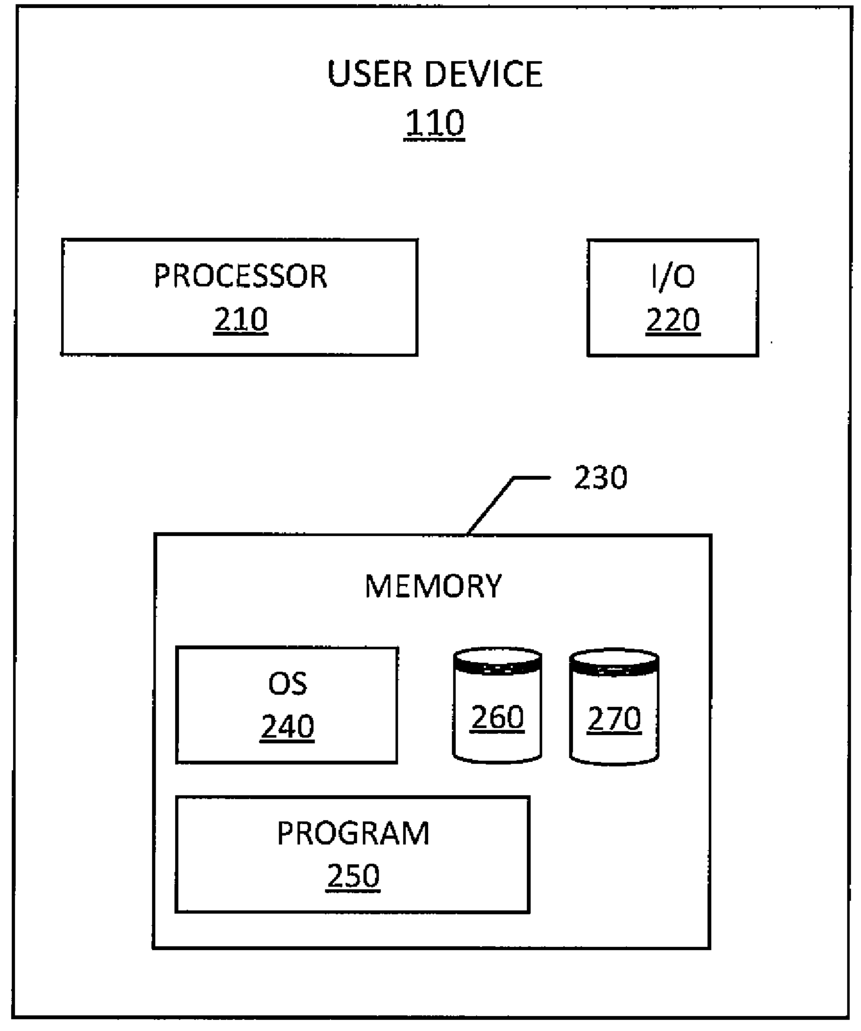
FIG. 3 illustrates a block diagram of an example user device, in accordance with some embodiments of the present disclosure.

FIG. 3 shows an example embodiment of a user device 110. As shown, the user device 110 may include input/output ("I/O") device 220 for receiving data from another device (e.g., computing device 120), memory 230 containing operating system ("OS") 240, program 250, and any other associated component as described above with respect to computing device 120.

Figure 4A:
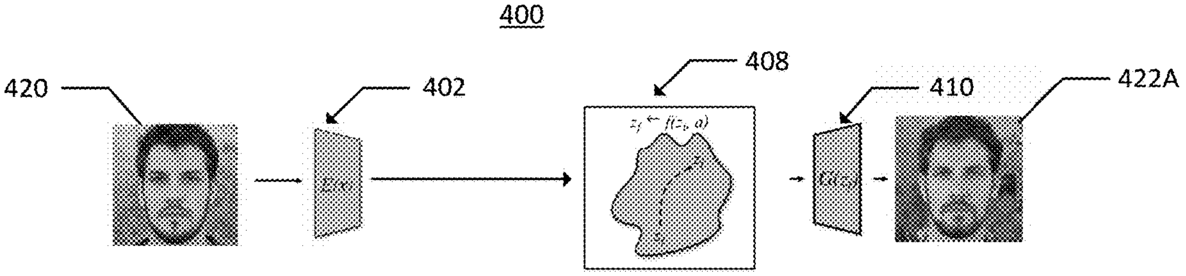
FIG. 4A illustrates an example illustration of a user input, in accordance with some embodiments of the present disclosure.

FIG. 4A illustrates at least a portion of the generative model 400 in accordance with various embodiments of the present disclosure. The generative model may include at least an attribute classifier 402, a latent space 408, and/or a generator 410. In various embodiments, the generative model 400 may receive a user input from at least one user device, wherein the user input comprises a preference of one or more initial item (e.g., initial image) 420. The one or more initial item may comprise at least one attribute may be one or more of: age, skin color, hair color, hair length, hair style, facial hair, facial hair color, emotional expression, orientation of the item (e.g., images), or a combination thereof. In various embodiments, the at least one attribute may be related to a landscape, a skyline, the sky, etc. In various embodiments, the user input may further comprise an indication of a preference of the at least one attribute, such that, the generative model may learn to modify the at least one attribute (e.g., the first attribute and/or one or more additional attributes) based, at least in part, on a user preference. The generative model may be configured to modify two or more attributes simultaneously based at least in part on a user preference.

With further reference to FIG. 4A, in various embodiments, the attribute classifier 402 may receive the first user input related to the first set of items having at least a first attribute, such that, the first user input comprises a user preference to one or more starting items and is configured to assign at least one latent space vector value to individual attributes within the latent space of the generative model 400. In various embodiments, the generative model is configured to assign similar latent space vector values to similar attributes. For example, hair color and facial hair color may have latent space vectors that are mapped closely together within the generative model latent space 408, such that, the generative model 400 can more efficiently and effectively predict and adjust attributes of one or more generated item (e.g., images). In another example, the attribute classifier 402 may assign hair style and hair length with similar latent space vector values within the generative model latent space 408, such that, the model can more efficiently and effectively predict and modify attributes of one or more generated item (e.g., images). In various embodiments, the attribute classifier 402 may assign any attribute any latent space vector value in order to improve the efficiency of the generative model in predicting and/or modifying of a first attribute.

With even further reference to FIG. 4A, in various embodiments, the generator 410 may utilize the latent space 408, comprising one or more mapped attributes with a latent space vector, to generate at least one generated item 422A based at least in part on the user's preference to one or more starting item (e.g., images) 420. The at least one generated item may comprise at least one modified attribute. The at least one modified attribute may be modified based on the first user input, such that, the generative model modified a first attribute based on the user's preference from the first user input.

Figure 4B:
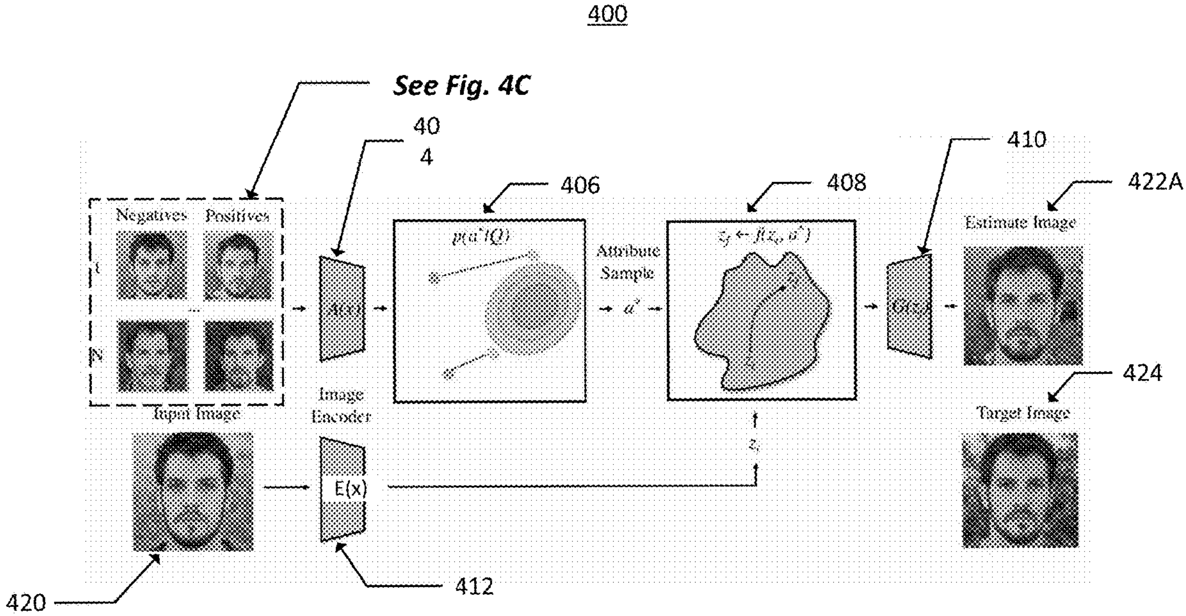
FIG. 4B illustrates an example illustration of a system for item editing, in accordance with some embodiments of the present disclosure.
Figure 4C:
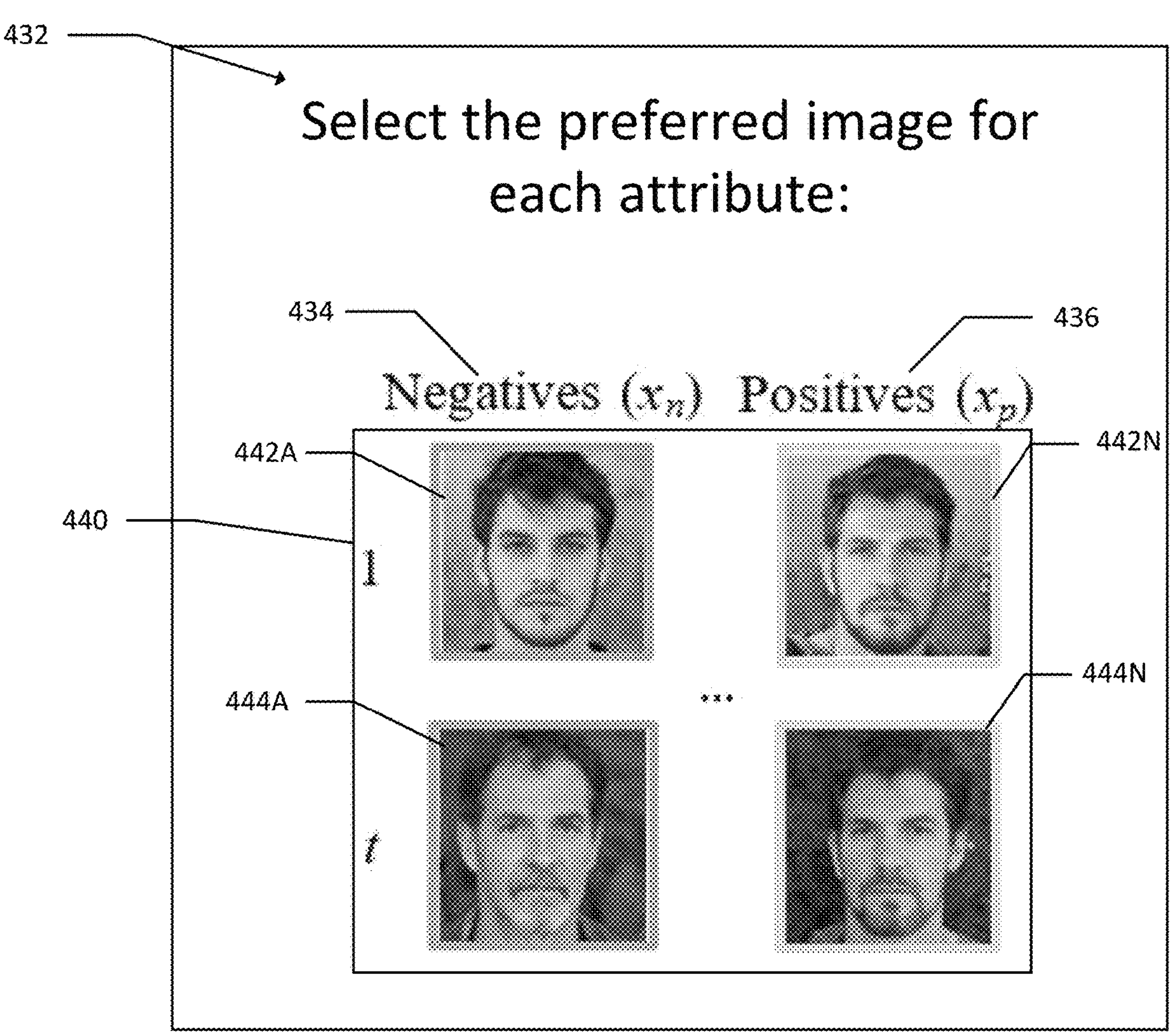
FIG. 4C illustrates an example illustration of a feedback prompt, in accordance with some embodiments of the present disclosure.

FIGS. 4B-4C illustrates at least a portion of the generative model in accordance with various embodiments of the present disclosure. In various embodiments, the generator 410, based on the first user input, may generate an adjusted generative item 422A comprising at least one modified attribute (e.g., a first modified attribute) based, at least in part, on a prediction of a user preference. The generator 410 may be further configured to generate a second set of items (e.g., images), such that, the second set of items may comprise a first item 422A and or one or more additional item. The first item 422A and the one or more additional item 422 are configured to comprise different representations of the first modified attribute. In various embodiments, the first item 422A and/or the one or more additional item 422 may be configured to comprise a modified representation of a first modified attribute and one or more additional modified attribute. In various embodiments, the different representations of the at least one modified attribute is configured for the generative model to learn from a user's preference related to the first item (e.g., first image) and/or the one or more additional item (e.g., one or more additional image). For example, the first image may comprise an image with black hair coloring and the one or more additional image may comprise an image with red hair coloring. In another example, the first image may comprise an image with black hair coloring, blue eyes, and an older age profile and the one or more additional image may comprise an image with red hair coloring, brown eyes, and a younger age profile. In various embodiments, the first image and the one or more additional image may comprise at least one modified attribute (e.g., a first modified attribute) that is the same. For example, the first image may comprise an image with black hair coloring with blue eyes and the one or more additional image may comprise an image with red hair coloring with blue eyes.

With further reference to FIG. 4B, in various embodiments, the generator 410 generates the second set of items (e.g., images), such that, the second set of items comprises a first item (e.g., first image) and one or more additional item (e.g., one or more additional image) comprising at least one different modified attribute. In various embodiments, the generative model transmits the second set of items (e.g., images) to a user device via at least one transmitter of the computing device. In various embodiments, the generative model may additionally transmit a feedback prompt (e.g., depicted in FIG. 4C). In various embodiments, the second set of items (e.g., images) and the feedback prompt may be transmitted simultaneously. In other embodiments, the second set of items (e.g., images) may be transmitted before the feedback prompt. In another embodiment, the feedback prompt may be transmitted before the second set of items (e.g., images). In yet another embodiment, the feedback prompt may be configured to include the second, depicted in FIG. 4C.

With reference to FIG. 4C, in various embodiments, the feedback prompt (e.g., first feedback prompt, second feedback prompt, third feedback prompt, one or more additional feedback prompt) 430 may comprise a textual prompt 432 and/or a set of items (e.g., images) 440 (e.g., first set of items, second set of items, one or more additional set of items). In various embodiments, the textual prompt 432 may include textual language such as "Select the preferred image for each attribute, "Do you prefer image X or image X?" or the like. In other embodiments, the textual prompt 432 may comprise any textual language to prompt a user to provide preference feedback related to at least one generated item of the item set 440. More specifically, the textual prompt 432 may comprise any textual language to prompt a user to provide preference feedback data related to preference of at least one modified attribute of the one or more item within the item set 440. In various embodiments, the item set 440 may comprise one or more item with at least one attribute negatively modified attribute ($x_n$) 434 and/or one or more item with at least one attribute positively modified attribute ($x_p$) 436. In various embodiments, the feedback prompt 430 may comprise an item set 440, such that, the feedback prompt 430 prompts a user to provide feedback data related to at least one negatively modified ($x_n$) 434 attribute and/or at least one positively modified ($x_p$) 436 attributes for the first item and/or one or more additional item.

With further reference to FIG. 4C, in various embodiments, the set of items (e.g., images) 440 may comprise at least one item. In the depicted embodiment, the set of items (e.g., images) 440 may comprise a first item 442A and one or more additional item 442N related to at least one modified attribute. In various embodiments, the set of items (e.g., images) 440 may further comprise a first item 444A and one or more additional item 442N related to at least one additional modified attribute. In various embodiments, the item set 440 may comprise a first generated item 442A and one or more additional generated item 442N may comprise two or more modified generated attribute.

With even further reference to FIGS. 4B-4C, in various embodiments, the feedback prompt ($Q_t$) 430 for a $t^{th}$ feedback prompt (e.g., first feedback prompt, second feedback prompt, one or more additional feedback prompt) may be displayed on a graphical interface (e.g., screen, monitor, etc.) of a user device. A user may interact with the feedback prompt 430 in order to provide feedback data. The user may select the first item 442A or one or more additional item 442N, in which, the item more accurately modified one or more attribute for a desired item based on a user's preference. In various embodiments, the user may select a first item 442A or one or more additional item 442N for a first attribute (1) and/or may select a first item 444A or one or more additional item 444N for one or more additional attribute (t). In various embodiments, the feedback data may be received by an attribute classifier (A(x)) 404 to assist in the generative model learning from feedback data (e.g., user preference data). The feedback data may be denoted as $q_n$ hereinafter in the specification. In various embodiments, the first feedback data may be denoted as $q_1$ and/or the one or more additional feedback data may be denoted as $q_t$. In various embodiments, an estimator of target attribute 406 may perform a sequence of paired comparisons related to feedback data (e.g., user's preference to at least one generated item) received from the user device, in reference to Equation 1.

$$Q_t = \{q_1 \ldots q_t\} \quad \text{Eq. 1)}$$

In various embodiments, in response to at least one performed sequence of paired comparisons related to the feedback data (e.g., user preference data), the one or more paired comparisons may be used to calculate one or more posterior distribution for at least one attribute for an attribute space. In various embodiments, the generative model 400 is configured to determine at least one relationship between a feedback response (e.g., user preference data) for at least one relative attribute (e.g., first attribute, first modified attribute, etc.) through posterior distribution, such that, the model 400 determines at least one ideal point for the at least one attribute. In various embodiments, the generative model 400 may be configured to determine one or more attribute (a) to modify corresponding to a user target item (x*) 424. The generative model 400 is configured to utilize feedback data from at least one feedback prompt to reduce the number of feedback prompts needed to generate the target item 424. The generative model 400 is configured to output one or more feedback prompt to gather data on at least one relative attribute to modify, such that, the feedback data may include positive preference ($x_p$) and/or negative preference ($x_n$) to at least one attribute (e.g., relative attribute, a first attribute, a first modified attribute, one or more additional attribute). In various embodiments, the feedback prompt may further assist the generative model in learning a user preference to a positively modified attribute. Equation 1 illustrates the generative model determining one or more attribute (a) to modify by transmitting at least one feedback prompt (Q). In various embodiments, the calculation of the relationship between at least one feedback response and at least one attribute may be defined in terms of Equation 2-4.

$$\text{Attribute Space} = p(q \mid a) \quad \text{Eq. 2)}$$

$$Q_t = (x_p^t, x_n^t) \quad \text{Eq. 3)}$$

$$Q_t = \{(x_p^t, x_n^t) \mid x_p^t < x_n^t, \text{ For } N_{feedback\ prompts}\} \quad \text{Eq. 4)}$$

In various embodiments, $$x_p^t < x_n^t$$

is configured to indicate that in the $t^{th}$ feedback prompt the user preferred $$x_p^t \text{ to } x_n^t.$$

In various embodiments, the generative model 400 may assume that $$x_p^t < x_n^t$$

implies the user prefers one or more modified attribute. In various embodiments, the neural network may be configured to store the calculation from Equations 2-4 in order to assist the generative model in learning a user preference related to at least one attribute and/or at least one modified attribute.

With further reference to FIGS. 4B-4C, in various embodiments, the system 400 may estimate one or more ideal point (a*) for one or more attribute in the generative model latent space, based, at least in part, on the calculated posterior distribution of a corresponding attribute. In various embodiments, the one or more ideal point may be related to a corresponding modified attribute. In various embodiments, the generative model 400 may estimate two or more idea point for a first attribute ($a_1$) and/or one or more additional attribute ($a_t$). The first ideal point $$(a_1^*)$$

is configured to be related to the first attribute ($a_1$) and the one or more additional ideal point $$(a_t^*)$$

is configured to be related to the one or more additional attribute ($a_t$). The first ideal point and/or the one or more additional ideal point may be related to a user preference of one or more item of a generated set of items (e.g., images) and/or response to at least one feedback prompt. In various embodiments, the generative model 400 may utilize one or more ideal point to reduce the number of feedback data needed to generate the target item. In various embodiments, the generative model 400 comprises a first user input ($x_t$) 420, which is inputted into the item encoder (E(x)) 412, such that, the item encoder 412 maps ($z_t$) the one or more attributes of the first user input to the latent space 408. Equation 5 illustrates the item encode 412 mapping the at least one attribute of the first user input ($x_t$) 420 into the latent space 408 of the generative model, such that, the at least one attribute are mapped based on similar attributes.

$$z_t = E(x_t) \quad \text{Eq. 5)}$$

In various embodiments, the generative model 400 may be configured to utilize an ideal point for at least one attribute and the corresponding mapped vector of the at least one attribute to calculate a final vector ($z_f$) within the latent space 408 of the generative model. Equation 6 illustrates the calculation of a final vector ($z_f$) for at least one attribute based on learning from a user's preference.

$$z_f \leftarrow f(z_t r) \quad \text{Eq. 6)}$$

The generative model is further configured to utilize the calculated final vector ($z_f$) to an item space of the generator ($G(z_f)$) 410 to generate one or more estimated item 422 with one or more modified attribute, such that, the one or more estimated item.

In various embodiments, the generative model 400 may utilize a Bayesian framework to assist with calculating p(q|a) of at least one user preference over a modified attribute encode (A(x)) 404, such that, the generative model 400 may utilize feedback data from at least one feedback prompt ($Q_t$). Additionally and/or alternatively, the generative model 400 may further estimate at least one user preference by using an ideal point model for a set of attributes a∈A, such that, a∈A corresponds to the distance between vector a and the target attribute a*. In various embodiments, an attribute encoder (A(x)) 404 is configured to map at least one attribute (A) in an item space (X). In the Bayesian framework, the user prefers at least one item over one or more additional item as described in Equations 7-9.

$$a_p = A(x_p) \quad \text{Eq. 7)}$$

$$a_n = A(x_n) \quad \text{Eq. 8)}$$

$$x_p < x_n \Leftarrow \Rightarrow \|a^* - a_p\| < \|a^* - a_n\| \quad \text{Eq. 9)}$$

In various embodiments, the generative model 400 may be further configured, after receiving feedback data of the preference of the user for at least one attribute, to estimate the user preference for one or more additional modified attribute in one or more additional item set, as represented in Equation 10.

$$p(q \mid a) = \sigma\left(k_Q\|a - a_n\|^2 - \|a - a_p\|^2\right) \quad \text{Eq. 10)}$$

In various embodiments, σ is configured to be the logistic function of the generative model 400 and $k_Q$ is a scalar function that is configured to account for noise from one or more user response. In various embodiments, the one or more estimate produces a very high probability when a user prefers an item with positively modified attributes $a_p$ that is much closer to the ideal point a* than the item with negatively modified attributes an. In various embodiments, the noise constant $k_Q$ may be thought of a signal-to-noise ratio that may determine an expected amount of information to be contained in each feedback response. In various embodiments, the noise constant may be tunable with one or more feedback prompt delivered to one or more user device. In various embodiments, the generative model 400 may accommodate various sources of error, such as "noise" in user responses to paired feedback responses, as shown in Equation 11.

$$p(a \mid q_1, \ldots q_t) = \frac{p(a)\prod_{j=1}^{t} p(q_j \mid a)}{p(q_t \mid q_1, \ldots, q_{t-1})} \quad \text{Eq. 11)}$$

In various embodiments, p(a) is supposed to be the user preference, such that, the user preference may be uniform over a distribution. In various embodiments, the generative model 400 to sample from the posterior distribution $p(a|Q_t)$ where $Q_t=\{q_1, \ldots, q_t\}$ and take the expected value $E[a|Q_t]$ to form an estimate of the target modified attributes a*. Intuitively, this process can be thought of as a multidimensional generalization of the binary search algorithm.

In various embodiments, the generative model is configured to minimize the number of feedback prompts by using a mean-cut max-variance (MCMV) strategy. In various embodiments, the generative model using the MCMV strategy may be configured to select feedback prompt (q) along an axis within the latent space of the generative model that comprises high variance determined by Equation 10. The feedback may be represented by Equation 12.

$$q = (a_p, a_n) \quad \text{Eq. 12)}$$

In various embodiments, the generative model may bisect the means of the posterior calculated using equation by using Equation 13.

$$E[a \mid Q_t] \quad \text{Eq. 13)}$$

The plane that is calculated to bisect the at least one attribute may comprise a normal vector with a positive attribute portion ($a_p$) and a negative attribute portion ($a_n$), represent in Equation 14. Additionally, the generative model may apply a scalar offset (e.g., represent in Equation 15 to compute the variance of a posterior distribution in the direction of a feedback prompt for at least one attribute, represented in Equation 16.

$$v = 2(a_p - a_n) \quad \text{Eq. 14)}$$

$$\tau = |a_p|^2 - |a_n|^2 \quad \text{Eq. 15)}$$

$$\sigma_q = v * \sum_q v^T \quad \text{Eq. 16)}$$

$$\sum_q v^T$$

is configured to equal the covariance of samples from the posterior calculations. In various embodiments, the generative model, using the MCMV strategy, may cut the means, such that, the plane between the positive and negative attribute are parameterized by v calculated in Equation 14 and τ calculated in Equation 15 intersects with the mean of distribution, represented by Equation 17.

$$\mu_q = \frac{\left(v^T * E[a \mid Q_t] - \tau\right)}{|v|} \quad \text{Eq. 17)}$$

The generative model is configured to output one or more feedback prompts to minimize the noise constant by utilizing a hyperparameter to balance the relative importance of the mean-cut and maximum variance criteria, represented by Equation 18.

$$k_q * \sigma_q - \lambda\mu_q \quad \text{Eq. 18)}$$

A is configured to represent the hyperparameter. In various embodiments, the generative model may provide the ability to sample continuously from the attribute space enabling a direct selection of a feedback that is mean-cut and max-variance, such that, it is obviating the need to sample large numbers of candidate queries. The generative model selects a feedback with points equidistant to the mean that are along the axis of maximum variance of our posterior $p(a|Q_t)$.

In various embodiments, the noise constant ($k_q$) acts as a signal-to-noise ratio in the Bayesian approach to estimating user preferences. In some embodiments, a constant $k_q=10$ was found to generally give strong performance. This is satisfactory when comparing different approaches where the degree of noise in user responses to feedback prompts remains fixed However, in various embodiments, the responses to feedback prompts may not be fixed, such that, there may be different degree of noise for one or more feedback prompt. In response to the different degree of noise, the generative model system may tune a noise constant $k_q$ for each degree of noise. In various embodiments, the generative model may tune $k_q$ for each degree of noise is to generate a small dataset (≈1000 examples) of attribute triplets $t=(a_a,a_p,a_n)\in T$ that satisfy $|a_a-a_p|+n<|a_a-a_n|$ where $n\sim N(0,\sigma_n)$. The generative model may generate a dataset of triplets with varying degrees of noise, parameterized by the standard deviation $\sigma_n$. The generative model may want to select a noise constant $k_q$ for each degree of noise that minimizes the noise. In various embodiments, as the degree of noise in the dataset increases, the generative model becomes less confident in its estimate of the user's preferences. The way this is encoded is by decreasing the noise constant $k_q$ so that the $\sigma(k_q(\|a_a-a_n\|^1-\|a_a-a_p\|^2))$ goes closer to 0.5 on average.

Figure 5:
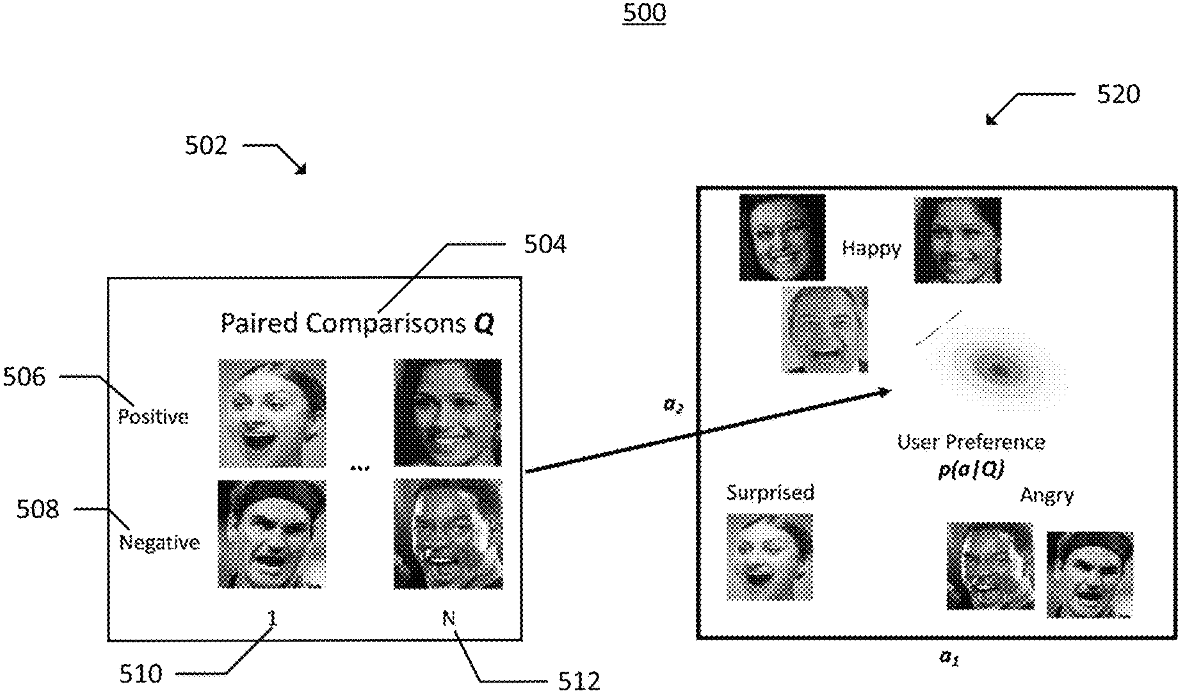
FIG. 5 illustrates an example illustration of a generative model latent space, in accordance with some embodiments of the present disclosure.

FIG. 5 illustrates an example latent space mapping function of the generative system in accordance with various embodiments of the present disclosure. In various embodiments, the feedback prompt 502 is configured to provide the generative model with feedback data to assist with mapping at least attribute and/or at least one modified attribute in a latent space 520 of the generative model. The feedback prompt 502 is configured to provide positive feedback 506 and/or negative feedback 508 related to at least one attribute and/or at least one modified attribute of a first item set 510 and positive feedback 506 and/or negative feedback 508 related to a first modified attribute and/or one or more additional modified attribute of one or more additional figure set 512. In various embodiments, the feedback data is configured to assist with mapping similar attributes closely together within the latent space 520 in order to improve the prediction and/or generation of one or more additional generative items (e.g., images) with at least one modified attribute. As depicted in FIG. 5, the feedback data is configured to map at least one image comprising a happy attribute closely together, surprised attribute closely together, and/or angry attribute closely together. In various embodiments, the generative model is configured to utilize the latent space to more accurately predict the modification of at least one attribute in one or more generated items (e.g., images).

Figure 6A:
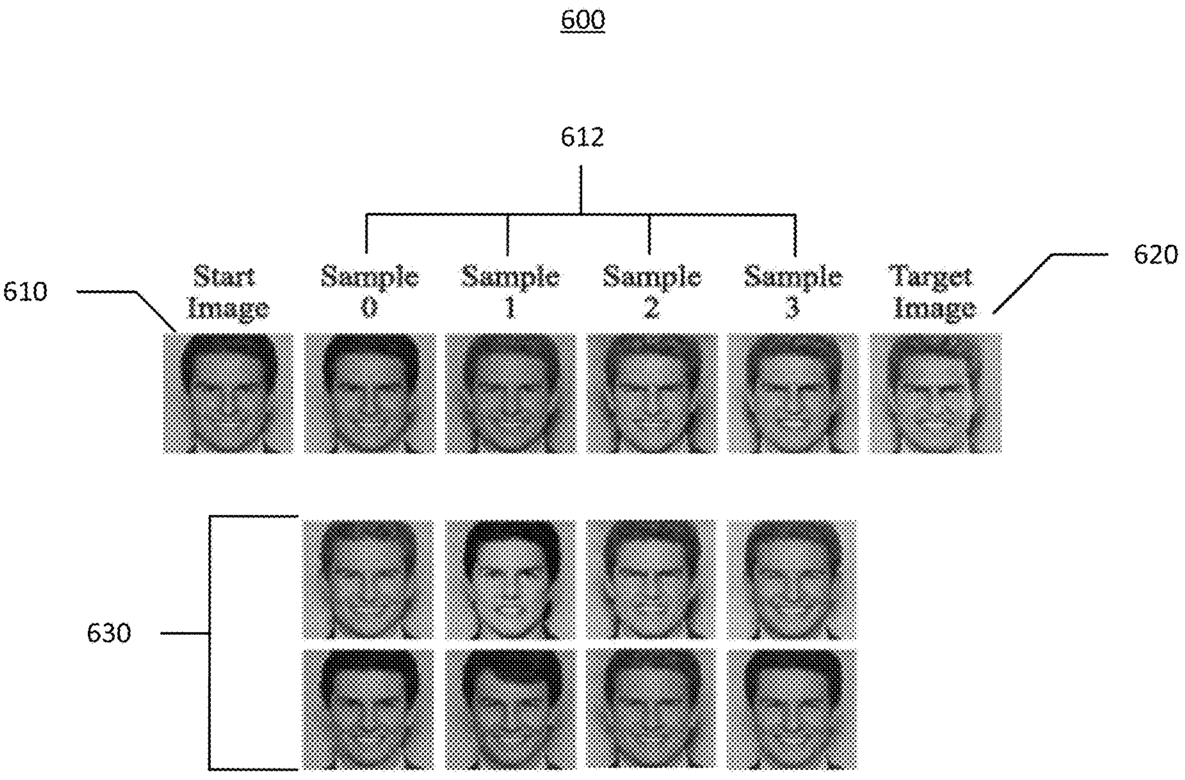
FIG. 6A illustrates an example set of generated items comprising at least one attribute, in accordance with some embodiments of the present disclosure.

FIGS. 6A-6E illustrate example figure sets comprising positive and negative items (e.g., images) in accordance with various embodiments of the present disclosure. In various embodiments, the example figured sets comprise a first input item 610 and a target item 620 based on a user's preference. As depicted in FIG. 6A, in various embodiments, the generative model may output a plurality of item set 630, such that, the user is configured to provide feedback data related to one or more item. The feedback data comprises at least data related to a user's preference of at least one generated item. In various embodiments, the generative model is configured to learn and predict from the feedback data at least one or more additional sample item 612 comprising a modified attribute.

Figure 6B:
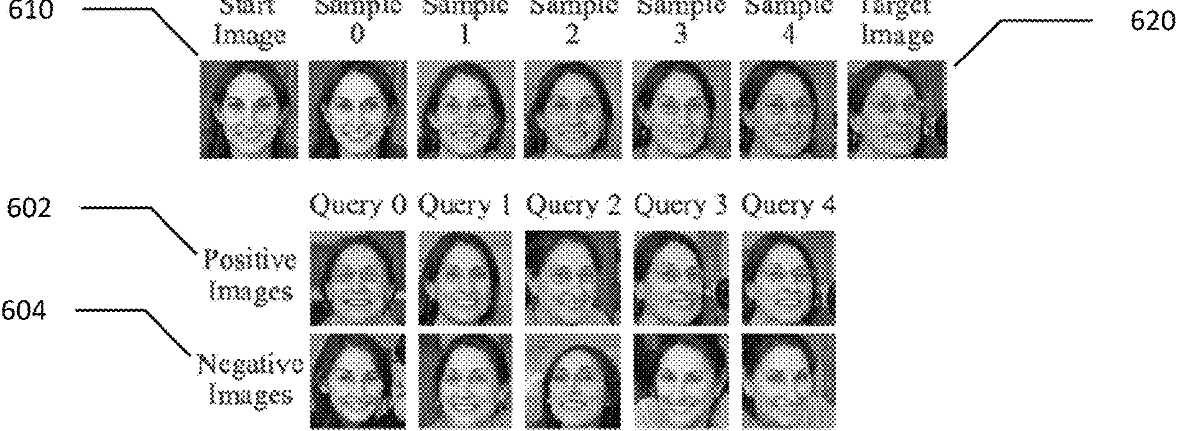
FIG. 6B illustrates an example set of generated items comprising at least one attribute, in accordance with some embodiments of the present disclosure.
Figure 6C:
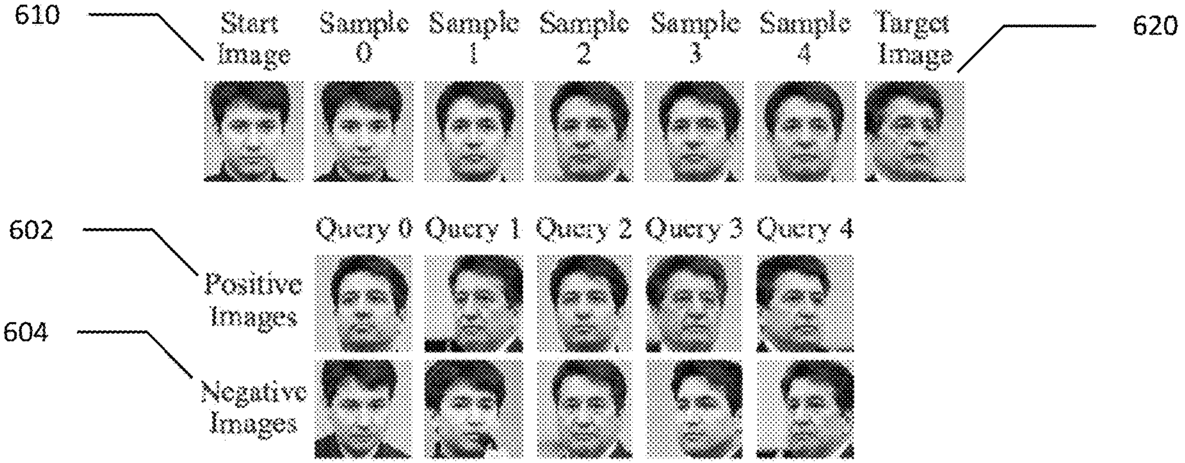
FIG. 6C illustrates an example set of generated items comprising at least one attribute, in accordance with some embodiments of the present disclosure.
Figure 6D:
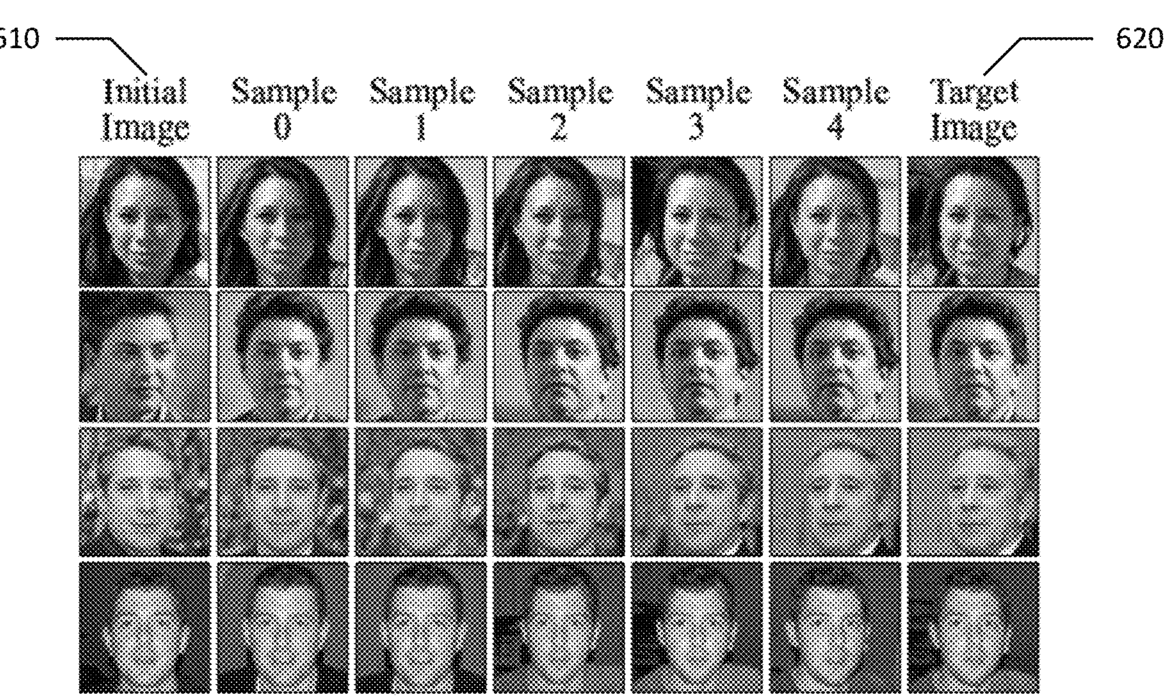
FIG. 6D illustrates an example set of generated items comprising at least one attribute, in accordance with some embodiments of the present disclosure.

With reference to FIGS. 6B-6D, in various embodiments, the item set may comprise positive items (e.g., images) 602 and/or negative items (e.g., images) 604 based on a user's preference of at least one modified attribute. In various embodiments, FIGS. 6B-6D illustrated a generative model starting with a first user input 610 and outputting at least one feedback data. The generative model utilizes the feedback data to learn and predict a user's preference based on the one or more feedback prompt response until the model has generated a target item 620.

Figure 6E:
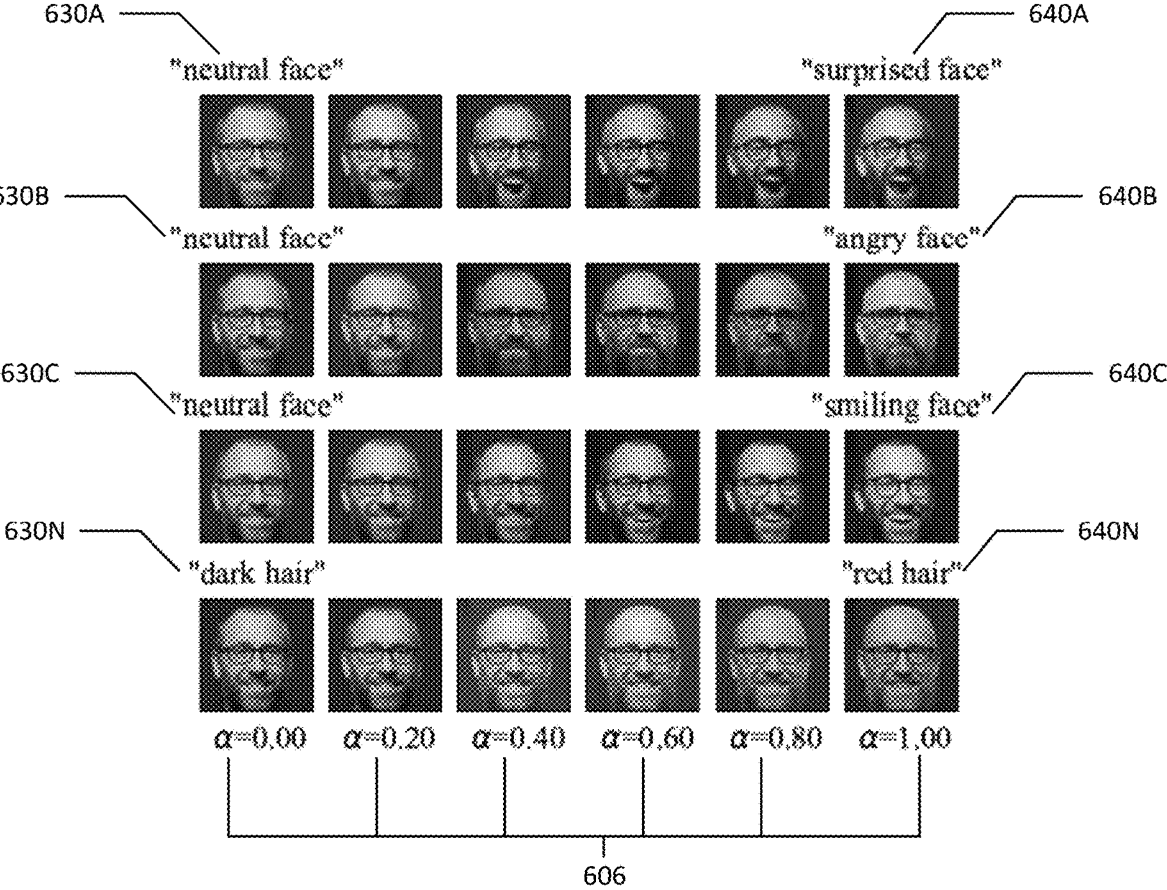
FIG. 6E illustrates an example set of generated items comprising at least one attribute, in accordance with some embodiments of the present disclosure.

With reference to FIG. 6E, in various embodiments, the generative model may be configured to learn a scale 606 as it relates to one or more attribute and/or one or more modified attribute (e.g., emotional expression, hair color, skin color, eye color, face shape, etc.). In various embodiments, the generative model may learn from one or more feedback prompt responses to modify a first attribute and one or more additional attribute. As depicted, the scale 606 may comprise a neutral item 630A, 630B, 630C, 630N (collectively "630) and a fully developed item 640A, 640B, 640C, 640N (collectively "640"). In various embodiments, the generative model may utilize the scale 606 to more accurately predict and modify one or more attribute of a generative item.

Figure 7A:
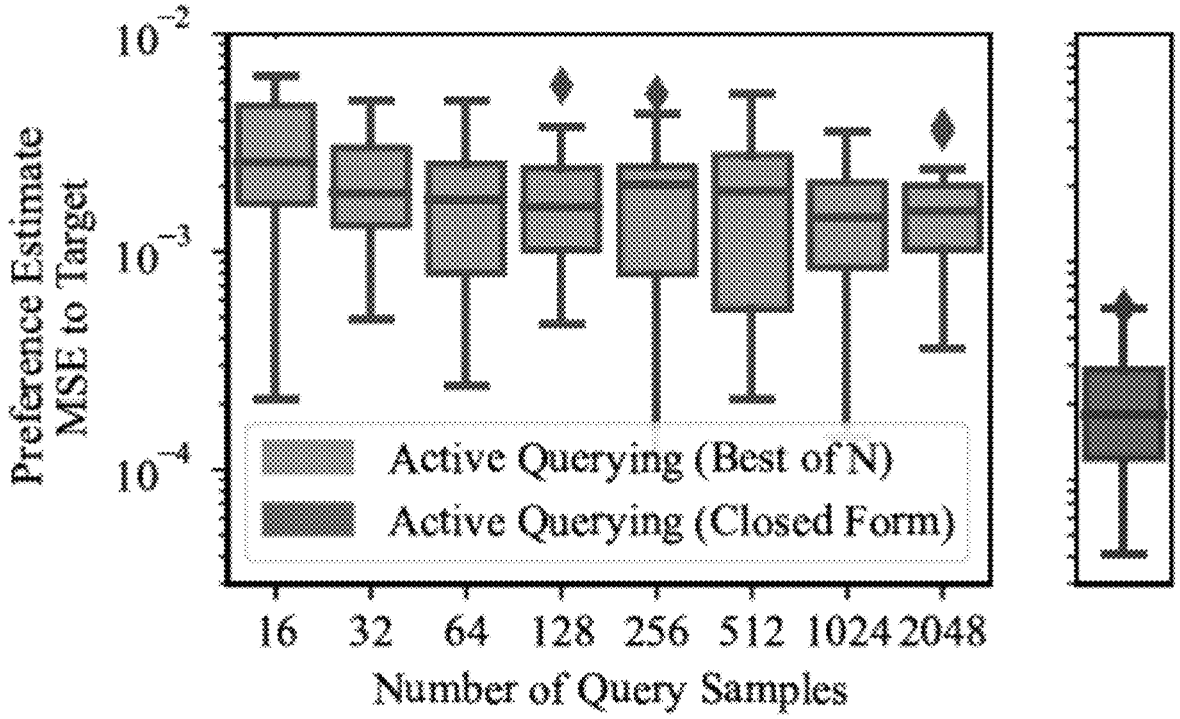
FIG. 7A illustrates an example graph illustrating improvement of active selection, in accordance with some embodiments of the present disclosure.
Figure 7B:
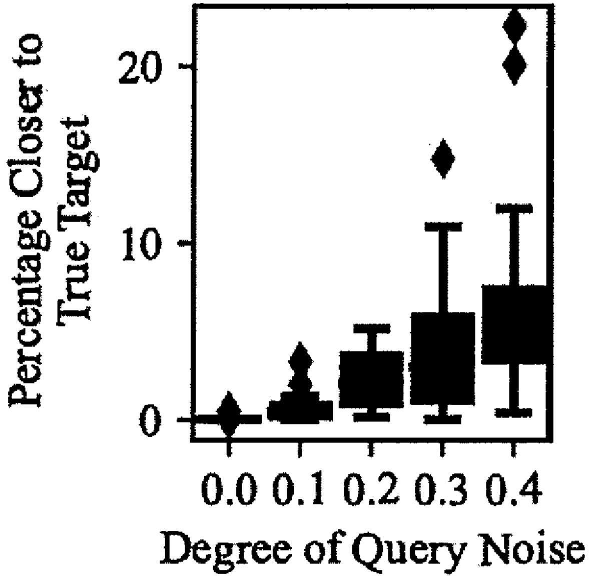
FIG. 7B illustrates an example graph illustrating query noise, in accordance with some embodiments of the present disclosure.
Figure 7C:
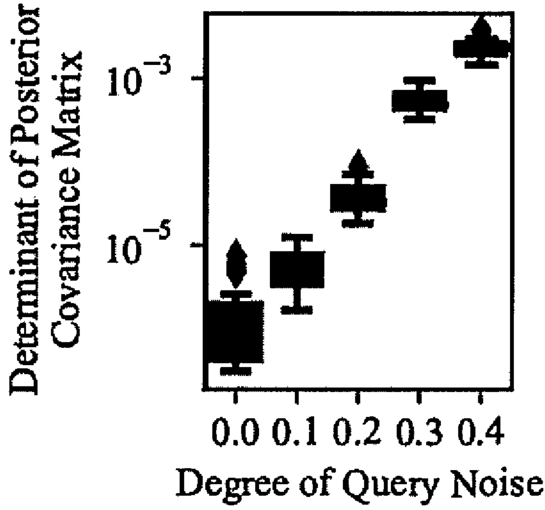
FIG. 7C illustrates an example graph illustrating query noise, in accordance with some embodiments of the present disclosure.

FIGS. 7A-7E illustrates an example graph showing the reduced number of feedback prompts needed to generate the target item in accordance with various embodiments of the present disclosure. In various embodiments, the generative model may use a mean-cut max-variance (MCMV) strategy with supervised attribute mapping and/or CLIP attribute mapping to reduce the number of feedback prompts needed to generate an ideal item. With reference to FIG. 7A, in various embodiments, the generative model may utilize CLIP attribute mapping to reduce the number of feedback prompts needed to generate an ideal item. In various embodiments, CLIP attribute mapping is configured to find a latent vector that generates an item with a certain attribute, without altering the identity of a given input latent vector. In various embodiments, a gradient based approach may be used for finding latent vectors that generate items (e.g., images) with certain textual attributes. The generative model may further encode model relative attributes, allowing the system to interpolate between two text prompts: a neutral text prompt, for example, "a person with a neutral expression" and a target text prompt, for example, "a person with an angry expression". In various embodiments, the system may embed these prompts into CLIP space using the CLIP text encoder T (t) to produce a neutral and target vector $t_n$ and $t_t$ respectively. Items (e.g., images) with cosine similarity close to $t_n$ will have neutral expressions, and those closer to $t_t$ will better match the target prompt. V(x) may be the CLIP vector of an item $x\in X$. In various embodiments, the generative model can predict the intensity of an attribute by computing the cosine similarity between V(x) and our attribute direction, represented in Equation 19.

$$t_a = t_t - t_n = \frac{\langle V(x), t_a\rangle}{\|V(x)\|\|t_a\|} \quad \text{Eq. 19)}$$

In various embodiments, the generative model may further modify at least one attribute by choosing one or more $\alpha \in [0,1]$ and minimizing the distance between our current predicted attribute intensity and $\alpha$. The generative model may use gradient descent with additional penalty terms to ensure the identity of the item stays the same. This approach allows the generative model to quantitatively model the intensity of a relative attribute, which is difficult to do by directly encoding text prompts.

With reference to FIGS. 7A, in various embodiments, the generative model may be configured to utilize PerfGen with a supervised attribute mapping method to generate at least one item comprising at least one modified attribute. In various embodiments, PerfGen, is configured to control the generative model using the information from pairwise comparisons. PerfGen method is configured to work in conjunction with both a supervised attribute mapping and CLIP-based textual attribute mapping.

Figure 7D:
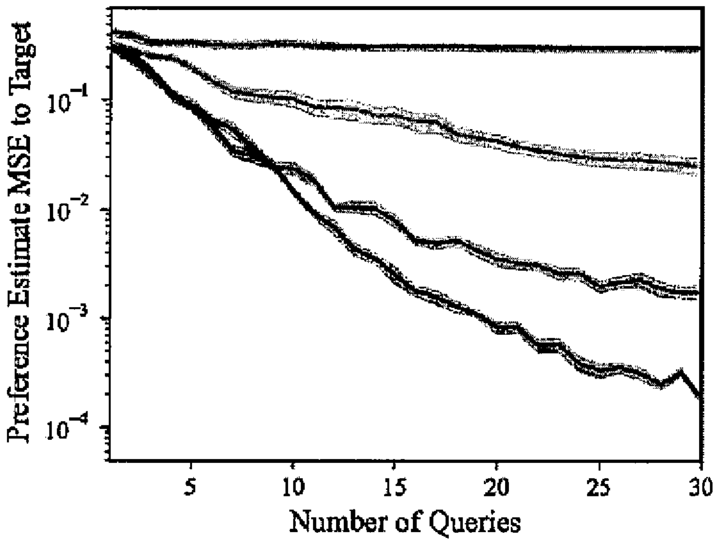
FIG. 7D illustrates an example graph illustrating preference estimate to target with relationship to a number of queries, in accordance with some embodiments of the present disclosure.
Figure 7E:
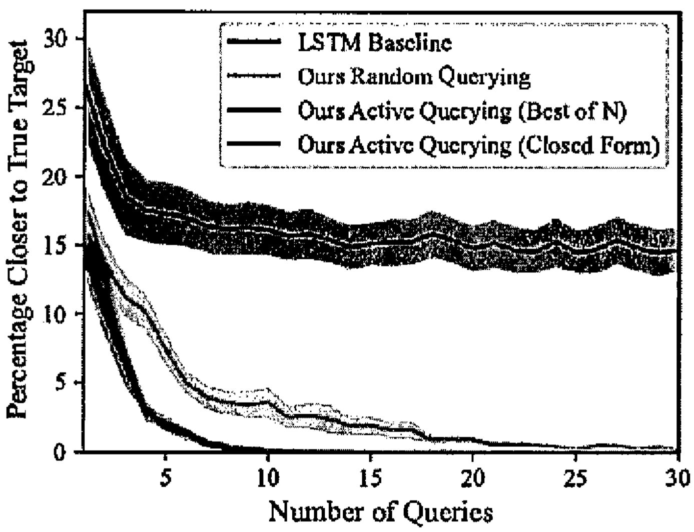
FIG. 7E illustrates an example graph illustrating preference closer to a true target with relationship to a number of queries, in accordance with some embodiments of the present disclosure.

In various embodiments, f is to train a neural network with supervised learning that maps attributes to the latent space of the generative model. In various embodiments, the generative model may utilize methods from GANControl to construct supervised mappings from the pose (yaw, pitch, and roll) and the apparent age of a face to the latent space of a StyleGAN2 using a Human Attributes dataset. In various embodiments, for each FIGS. 7B-7C, 20 trials of preference estimation, each with 30 feedback prompts and $k_Q=10$. Quantitative Evaluation of PrefGen to measure the ability of the generative model to estimate a user's target attributes (a*) both precisely and efficiently, the generative model may use three key metrics: (1) the Mean Squared Error (MSE) of current estimates and the ground truth attribute in the attribute space after each feedback prompt response, (2) the percentage of attributes closer than the estimate to the target attributes (a*), and (3) the percentage of paired comparison constraints where the estimate of the target attributes (a*) may be closer to the positive than the negative. FIGS. 7D-7E illustrates random feedback changes versus active feedback changes in order to reduce the number of feedback prompts needed to generate the target item comprising at least one modified attribute. In various embodiments, the supervised attribute mapping is configured to converge on preference estimates with low MSE to the target attributes and that are closer than a large percentage of randomly sampled attribute vectors. In various embodiments, PrefGen can estimate a set of attributes that satisfy a high percentage of constraints. Further, patterns may be replicated when searching over higher dimensional attribute spaces.

In various embodiments, PrefGen may be further configured to sample a latent vector for at least one attribute after receiving first feedback data and/or one or more additional feedback data, represented by Equation 20.

$$z_f = f(z_i, E[a \mid Q_t] \quad \text{Eq. 20)}$$

$E[a|Q_t]$ is configured to be the expected user preference related to at least one modified attribute of an item set. After sampling a latent vector, the generative model using PrefGen may further generate a corresponding item ($G(z_f)$, such that, qualitatively, the modified attributes of the preference samples converge to the attributes of the target items (e.g., images). In various embodiments, various sources of noise can cause errors or inconsistencies in the generative model responses to feedback prompts. Therefore, it is desirable for the generative model to be robust to such noise. To evaluate PrefGen's robustness to query noise, the generative model may further comprise a Gaussian noise to the feedback likelihood, represented by Equation 21 and 22.

$$\sigma\left(k_g\left(\|a - a_n\|^2 - \|a - a_p\|^2 + n\right)\right) \quad \text{Eq. 21)}$$

$$n \sim N(0, \sigma_n) \quad \text{Eq. 22)}$$

$\sigma_n$ is configured to be the degree of noise added. For each degree of noise, we tune $k_q$ using maximum likelihood estimation on a set of training triplets. As the degree of noise increases, the performance of preference estimation degrades, but more importantly, it does not catastrophically fail. Additionally, the generative model may quantify uncertainty in our posterior $p(a|Q_t)$ by computing the determinant of the covariance matrix of samples drawn from $p(a|Q_t)$, which shows that as the amount of noise increases there is an increase in the uncertainty of posterior.

Figure 8A:
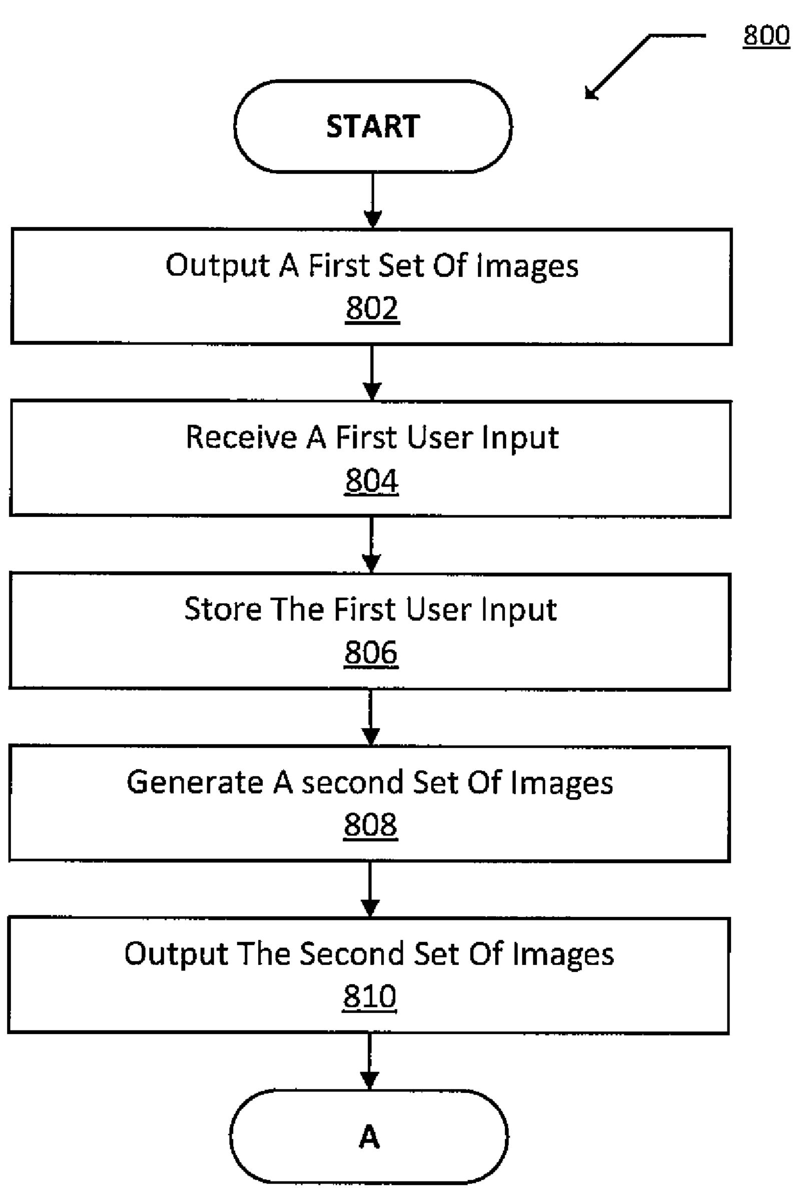
FIG. 8A illustrates an example flow chart of a method for generating a set of items, in accordance with some embodiments of the present disclosure.
Figure 8B:
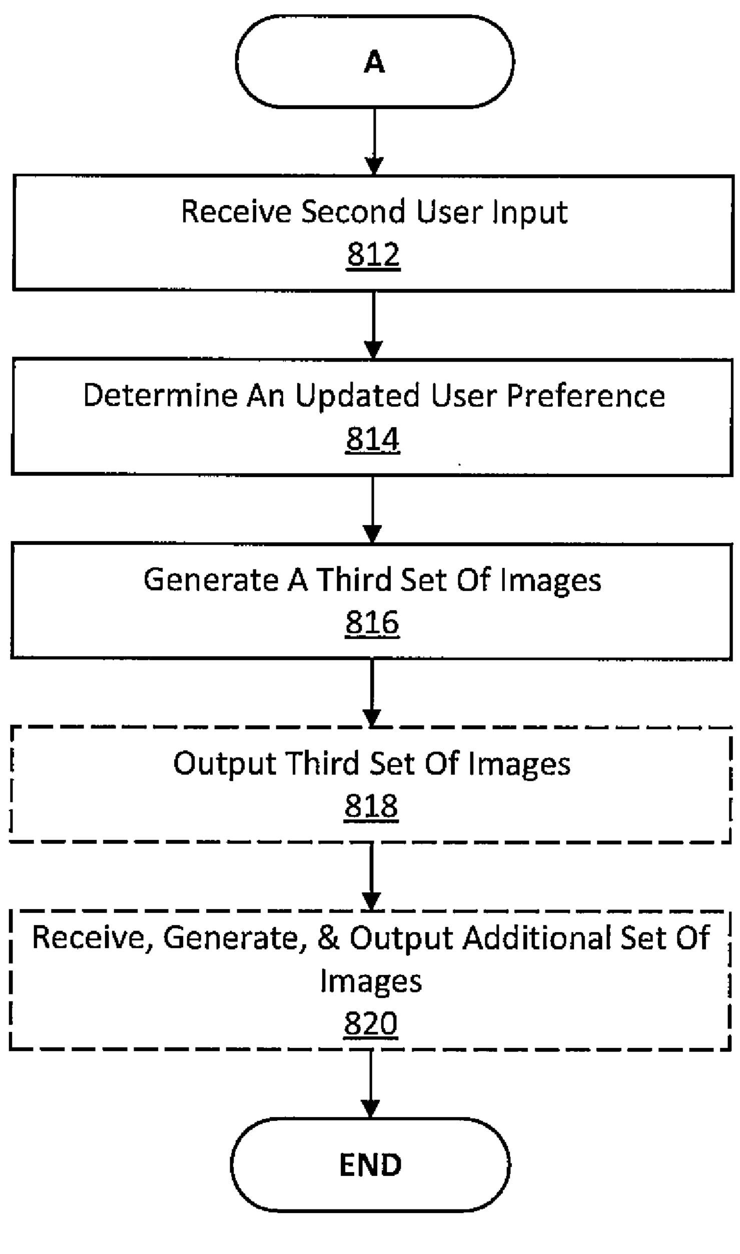
FIG. 8B illustrates an example flow chart of a method for generating a set of items, in accordance with some embodiments of the present disclosure.

FIGS. 8A-8B illustrate a flow diagram of an exemplary method 800 for generating at least one item comprising at least one modified attribute in accordance with various embodiments of the present disclosure. The steps of method 800 may be performed by one or more components of the system, computing device, and/or user device, as described in more detail with respect to FIGS. 2-3 and 4B-4C. The computing system 120 comprising the generative model 400 and/or the user device 110 may begin method 1000 as a result of receiving and/or transmitting a first user input, such that, the first user input comprises an initial item comprising at least one attribute. The first user input may be transmitted via at least one transmitter 114, 124 along the network and/or stored on the neural network 130.

Method 800 may begin with the system generating a first set of items (e.g., images), such that, the first set of items may comprise a first item and one or more additional item. In various embodiments, a user transmitting a first user input, such that, the first user input comprises feedback related to the first set of items (e.g., images), block 802. In various embodiments, the first user input may comprise a user's preference to a pair of items (e.g., images) that comprise at least one attribute. In various embodiments, the user's preference may an indication for at least one attribute to modified (e.g., first modified attribute). The first user input may be transmitted from a user device to the computing device via the network.

In block 804, the system is configured to receive a first user input. The first user input comprises information related to a user's preference to the first set of items (e.g., images). In various embodiments, the first user input may further comprise an indication for a first attribute to be modified and one or more additional attribute to be modified.

In block 806, In various embodiments, the first user input data is configured to be stored on the neural network. In some embodiments, the neural network may be configured to receive and/or store the first user input. In various embodiments, the neural network may store the starting item comprising at least one attribute. The neural network may be configured to further store the textual input for at least one attribute to be modified.

In block 808, the generative model is configured to receive the first user input and generate one or more items (e.g., images) comprising at least one modified attribute (e.g., a first modified attribute), such that, the generative model generates a second set of items (e.g., images). In various embodiments, the generative model may utilize an attribute classifier, attribute estimation of at least one target attribute, and/or an item encoder to generate the at least one item. In various embodiments, the generative model may be configured to generate a first item and one or more additional item, such that, the first item comprises a first representation of the first modified attribute and the one or more additional item comprises one or more additional representation of the first modified attribute. In some embodiments, the first item and the one or more additional item comprising the first modified attribute may be stored on the neural network to further assist with generating one or more additional item.

In block 810, the computing system may output a second set of items (e.g., images) via a transmitter to the user device. In various embodiments, the second set of items (e.g., images) may comprise a first generated item comprising a first representation of the first modified attribute and one or more additional generated item comprising one or more additional representation of the first modified attribute. In various embodiments, the first item and the one or more additional item may adjust one or more different attribute (e.g., first image adjusts eye color, and one or more additional image adjusts hair color). In other embodiments, the first item and the one or more additional item may adjust at least one similar attribute and at least one different attribute.

In various embodiments, the computing system is configured to output the second set of items with a feedback prompt to a user device. In various embodiments, the second set of items comprises a first item and one or more additional item, such that, the first item comprises a first configuration of the first modified first attribute and the one or more additional item comprises one or more additional configuration of the first modified first attribute. The feedback prompt and the second set of items (e.g., images) may be transmitted simultaneously. In other embodiments, the feedback prompt may be transmitted to the user device before the second set of items (e.g., images). In another embodiment, the second set of items (e.g., images) may be transmitted to the user device before the feedback prompt. In various embodiments, the feedback prompt may comprise a textual prompt for the user to provide preference feed related to the second item and one or more additional item of the first set of items (e.g., images).

In block 812, the computing system is configured to receive a second user input comprising second feedback data from the user device, such that, the feedback data comprises information related to the second set of items (e.g., images). In various embodiments, the feedback may comprise data related to a user preference to one or more items (e.g., images) with at least one modified attribute (e.g., first modified attribute). In various embodiments, the system may store the feedback data on the neural network to further assist with generating and/or modifying one or more additional items (e.g., images) and/or items sets based on the feedback data and the predicted user's preference. In various embodiments, the feedback data may further comprise data related to a user's positive preference and/or negative preference related to at least one modified attribute from the second item set. In some embodiments, the user may prefer a first modified first attribute of the first item or one or more additional modified first attribute of the one or more additional item of the second item set.

In block 814, the generative model may utilize the first user input and/or the second user input to determine an updated user preference for the first modified attribute and/or one or more additional modified attribute. In various embodiments, the generative model may further utilize data stored on the neural network to determine an updated user preference.

In block 816, the generative model may utilize the first user input and/or the second to generate a third set of items (e.g., images) with at least one modified attribute. In various embodiments, the third set of items (e.g., images) is configured to comprise a first item and one or more additional items (e.g., images). In various embodiments, the third set of items (e.g., images) is configured to comprise a first item and one or more additional item with at least one modified attribute (e.g., a first modified attribute). In various embodiments, the generative model may utilize an attribute classifier, attribute estimation of at least one target attribute, and/or an item encoder to generate the at least one item. In various embodiments, the generative model may be configured to generate a first item and one or more additional item, such that, the first item comprises a second modified first attribute and the one or more additional item comprises one or more additional second first modified attribute. In some embodiments, the first item and the one or more additional item comprising the first modified attribute may be stored on the neural network to further assist with generating one or more additional item.

In block 818, the computing system may output a third set of items (e.g., images) via a transmitter to the user device. In various embodiments, the third set of items (e.g., images) may comprise a first item and one or more additional item, such that, the first item comprises a second modified first attribute and the one or more additional item comprises one or more additional second first modified attribute. In various embodiments, the first item and the one or more additional item may modify one or more different attribute (e.g., first image adjusts eye color, and one or more additional image adjusts hair color). In other embodiments, the first item and the one or more additional may modify at least one similar attribute and at least one different attribute. In an example embodiment, the third set of items (e.g., images) may comprise the preferred item from the first set of items (e.g., images), the second item, and/or one or more additional generated item. In various embodiments, the third set of items (e.g., images) may be outputted with a feedback prompt.

In various embodiments, the computing system is configured to output the second set of items with a feedback prompt to a user device. In various embodiments, the second set of items comprises a first item and one or more additional item, such that, the first item comprises a first configuration of the first modified first attribute and the one or more additional item comprises one or more additional configuration of the first modified first attribute. The feedback prompt and the second set of items (e.g., images) may be transmitted simultaneously. In other embodiments, the feedback prompt may be transmitted to the user device before the second set of items (e.g., images). In another embodiment, the second set of items (e.g., images) may be transmitted to the user device before the feedback prompt. In various embodiments, the feedback prompt may comprise a textual prompt for the user to provide preference feed related to the second item and one or more additional item of the first set of items (e.g., images).

In block 820, the computing system may optionally receive feedback data related to the third set of items (e.g., images). In various embodiments, the computing system may optionally generate and output one or more additional set of items (e.g., images) until at least one generated item meets a predetermined satisfaction level. In various embodiments, the generative system is configured to receive feedback data, determined an updated user preference, generate one or more additional set of items (e.g., images), and/or output the one or more additional set of items (e.g., images) as described in blocks 810, 812, 814, and 816, respectively.

In various embodiments, the computing system may further transmit a second feedback prompt with the second set of items (e.g., images). The second feedback prompt and the second set of items (e.g., images) may be transmitted simultaneously. In other embodiments, the second feedback prompt may be transmitted to the user device before the second set of items (e.g., images). In another embodiment, the second set of items (e.g., images) may be transmitted to the user device before the second feedback prompt. In various embodiments, the first feedback prompt may comprise a textual prompt for the user to provide preference feed related to the second item and one or more additional item of the second set of items (e.g., images).

In block 816, the computing system is configured to receive second feedback data from the user device, such that, the second feedback data comprises information related to the second set of items (e.g., images). In various embodiments, the second feedback may comprise data related to a user preference to one or more items (e.g., images) with at least one generated modified attribute. In various embodiments, the system may store the second feedback data on the neural network to further assist with generating one or more additional items (e.g., images) and/or item sets based on the feedback data. In various embodiments, the second feedback data may further comprise data related to a user's positive preference and/or negative preference related to at least one modified attribute from the second item set. In some embodiments, the user may prefer at least one modified attribute of the second item or at least one modified attribute of the one or more additional items (e.g., images) of the second item set.

In block 818, the method 800 may optionally further comprise generating one or more additional set of items (e.g., images) until the at least one generated item comprises the target attribute that the user prefers.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner. By "comprising" or "containing" or "including" is meant that at least the named element, or method step is present in article or method, but does not exclude the presence of other elements or method steps, even if the other such elements or method steps have the same function as what is named.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for guiding generation of items comprises:

a computing device comprising one or more processors;

a neural network;

a transceiver; and at least one memory in communication with the computing device, the neural network, and the transceiver, the at least one memory storing computer program code that, when executed by the computing device, is configured to cause the system to:

output a first set of items having a first attribute with a first feedback prompt to a user device;

receive from a user a first user input of a selection of a selected item in the first set of items;

store the first user input to the neural network;

determine, based on the first user input, a user preference for the first attribute, the user preference free of any textual articulation for the first attribute;

generate, using the neural network, a second set of items comprising a first item and one or more additional items, the first item of the second set comprising a first configuration of a first modified first attribute, the one or more additional items of the second set comprising one or more additional configurations of the first modified first attribute, wherein the first modified first attribute is based, at least in part, on the user preference for the first attribute, and wherein the first configuration and the one or more additional configurations of the first modified first attribute are configured to be different;

output the second set of items having the first modified first attribute with a second feedback prompt to a user device;

receive from the user a second user input of a selection of a selected item in the second set of items;

store the second user input to the neural network;

determine, based on at least the second user input, an updated user preference for the first attribute, the updated user preference free of any textual articulation for the first attribute; and generate, using the neural network, a third set of items comprising a second modified first attribute, wherein the second modified first attribute is based, at least in part, on the updated user preference for the first attribute.

2. The system of claim 1, wherein the neural network is configured to map similar user preferences related to the first modified first attribute and a second modified second attribute closely together within a structured latent space to improve the system prediction and generation of at least one of the additional items.

3. The system of claim 1, wherein:

the second user input is received from the user device; and the second user input comprises information related to the selection of the selected item in the second set of items from among the first item and the one or more additional items.

4. The system of claim 3, wherein the computer program code, when executed by the computing device, is further configured to cause the system to:

output the third set of items having the second modified first attribute with a third feedback prompt to the user device;

wherein:

the third set of items comprises a first item and one or more additional items;

the first item of the third set comprises a first configuration of the second modified first attribute;

the one or more additional items of the third set comprise one or more additional configurations of second modified first attribute; and the first configuration and the one or more additional configurations of the second modified first attribute are configured to be different.

5. The system of claim 4, wherein the computer program code, when executed by the computing device, is further configured to cause the system to:

store feedback data on the neural network;

predict a user preference to an adjustment of at least one of:

the first modified first attribute of the first item of the second set or one or more of the additional items of the second set of items; or the second modified first attribute of the first item of the third set or one or more of the additional items of the third set; and generate one or more new items based, at least in part, on the prediction of the user preference related to the adjustment of at least one of the first or second modified first attribute.

6. The system of claim 5, wherein the computer program code, when executed by the computing device, is further configured to cause the system to:

adjust and generate one or more of the new items until the adjustment of at least one of the first or second modified first attribute meets a desired preference.

7. A method for guiding generation of images comprising:

outputting a first set of images having a first attribute with a first feedback prompt to a user device;

receiving from the user device a first user input of a selection of a selected image in the first set of images;

storing the first user input to a neural network;

determining, based on the first user input, a user preference for the first attribute;

generating, using the neural network, a second set of images comprising a first image and one or more additional images, the first image of the second set comprising a first configuration of a first modified first attribute, the one or more additional images of the second set comprising one or more additional configurations of the first modified first attribute, wherein the first modified first attribute is based, at least in part, on the user preference for the first attribute, and wherein the first configuration and the one or more additional configurations of the first modified first attribute are configured to be different;

outputting the second set of images having the first modified first attribute with a second feedback prompt to the user device;

receiving from the user device a second user input of a selection of a selected image in the second set of images;

determining, based on the first and second user inputs, an updated user preference for the first attribute;

generating, using the neural network, a third set of images comprising a second modified first attribute, wherein the second modified first attribute is based, at least in part, on the updated user preference for the first attribute; and mapping, with the neural network, similar user preferences related to the first modified first attribute and a second modified second attribute closely together within a generative model latent space to improve the system prediction and generation of at least one additional image.

8. The method of claim 7, wherein the generative model latent space is a structured latent space derived from an encoder or Contrastive Language-Image Pre-training (CLIP) embeddings.

9. The method of claim 7, wherein the second user input comprises information related to the selection of the selected image in the second set of images from among the first image and the one or more additional images.

10. The method of claim 9 further comprising:

outputting the third set of images with a third feedback prompt to the user device;

wherein:

the third set of images comprises a first image and one or more additional images;

the first image of the third set comprises a first configuration of the second modified first attribute;

the one or more additional images of the third set comprise one or more additional configurations of second modified first attribute; and the first configuration and the one or more additional configurations of the second modified first attribute are configured to be different.

11. The method of claim 10 further comprising:

storing feedback data on the neural network;

predicting a user preference to an adjustment of at least one of:

the first modified first attribute of the first image of the second set or one or more of the additional images of the second set;

the second modified first attribute of the first image of the third set or one or more of the additional images of the third set; and generating one or more new images based, at least in part, on the prediction of the user preference related to the adjustment of at least one of the first or second modified first attribute.

12. The method of claim 11 further comprising:

adjusting and generating one or more of the new images until the adjustment of at least one of the first or second modified first attribute meets a desired preference.

13. A non-transitory computer readable medium having stored thereon instructions comprising executable code for guiding generation of items, when executed by one or more processors, causes one or more of the processors to:

output a first set of items having a first attribute with a first feedback prompt to a user device;

receive from the user device a first user input of a preference of a selection of a selected item in the first set of items, wherein the selection does not require a user to articulate the preference textually;

store the first user input to a neural network;

determine, based on the first user input, a user preference for the first attribute;

generate, using the neural network, a second set of items comprising a first item and one or more additional items, the first item of the second set comprising a first configuration of a first modified first attribute, the one or more additional items of the second set comprising one or more additional configurations of the first modified first attribute, wherein the first modified first attribute is based, at least in part, on the user preference for the first attribute, and wherein the first configuration and the one or more additional configurations of the first modified first attribute are configured to be different;

output the second set of items having the first modified first attribute with a second feedback prompt to a user device;

receive from the user device a second user input of a preference of a selection of a selected item in the second set of items, wherein the selection does not require the user to articulate the preference textually;

determine, based on the first and second user inputs, an updated user preference for the first attribute; and generate, using the neural network, a third set of items comprising a second modified first attribute, wherein the second modified first attribute is based, at least in part, on the updated user preference for the first attribute.

14. The non-transitory computer readable medium of claim 13, wherein the neural network is configured to map similar user preferences related to the first modified first attribute and a second modified second attribute closely together within a structured latent space derived from an encoder or Contrastive Language-Image Pre-training (CLIP) embeddings to improve a system prediction and generation of at least one of the additional items.

15. The non-transitory computer readable medium of claim 13, the second user input comprises information related to the selection of the selected item in the second set of items from among the first item and the one or more additional items.

16. The non-transitory computer readable medium of claim 15, wherein the instructions, when executed by one or more of the processors, further cause one or more of the processors to:

output the third set of items with a third feedback prompt to the user device;

wherein:

the third set of items comprises a first item and one or more additional items;

the first item of the third set comprises a first configuration of the second modified first attribute;

the one or more additional items of the third set comprise one or more additional configurations of second modified first attribute; and the first configuration and the one or more additional configurations of the second modified first attribute are configured to be different.

17. The non-transitory computer readable medium of claim 16, wherein the instructions, when executed by one or more of the processors, further cause one or more of the processors to:

store feedback data on the neural network;

predict a user preference to an adjustment of at least one of:

the first modified first attribute of the first item of the second set or one or more of the additional items of the second set; or the second modified first attribute of the first item of the third set or one or more of the additional items of the third set;

generate one or more new items, based at least in part, on the prediction of the user preference related to the adjustment of at least one of the first or second modified first attribute; and adjust and generate one or more of the new items until the adjustment of at least one of the first or second modified first attribute meets a desired preference.

18. A system for guiding generation of items comprises:

a computing device comprising one or more processors;

a neural network;

a transceiver; and at least one memory in communication with the computing device, the neural network, and the transceiver and storing computer program code that, when executed by the computing device, is configured to cause the system to:

output a first set of items having a first attribute;

receive from a user a first user input of a selection of a selected item in the first set of items;

store the first user input to the neural network;

generate, using the neural network, a second set of items comprising a first modified first attribute, wherein the first modified first attribute is based, at least in part, on a user preference for the first attribute;

output the second set of items having the first modified first attribute with a second feedback prompt to a user device;

receive from the user a second user input of a selection of a selected item in the second set of items;

determine, based on at least the second user input, an updated user preference for the first attribute; and generate, using the neural network, a third set of items comprising a second modified first attribute, wherein the second modified first attribute is based, at least in part, on the updated user preference for the first attribute;

wherein:

the second set of items comprises a first item and one or more additional items;

the first item comprises a first configuration of the first modified first attribute;

the one or more additional items comprise one or more additional configurations of the first modified first attribute; and the first configuration and the one or more additional configurations of the first modified first attribute are configured to be different.

19. The system of claim 18, wherein:

the second user input is received from the user device; and the second user input comprises information related to the selection of the selected item in the second set of items from among the first item and the one or more additional items.

20. The system of claim 19, wherein the at least one memory further comprises computer program code that, when executed by the computing device, is further configured to cause the system to:

output the third set of items having the second modified first attribute with a third feedback prompt to the user device;

wherein:

the third set of items comprises a first item and one or more additional items;

the first item comprises a first configuration of the second modified first attribute;

the one or more additional items comprise one or more additional configurations of second modified first attribute; and the first configuration and the one or more additional configurations of the second modified first attribute are configured to be different.

21. The system of claim 20, wherein the at least one memory further comprises computer program code that, when executed by the computing device, is further configured to cause the system to:

store feedback data on the neural network;

predict a user preference to an adjustment of at least one modified first attribute of the first item or one or more additional items of a set of items; and generate one or more new items based, at least in part, on the prediction of the user preference related to the adjustment of the at least one modified first attribute.

22. The system of claim 21, wherein the at least one memory further comprises computer program code that, when executed by the computing device, is further configured to cause the system to:

adjust and generate one or more of the new items until the adjustment of the at least one modified first attribute meets a desired preference.

* * * * *